US011113328B2

(12) United States Patent
Anorga et al.

(10) Patent No.: US 11,113,328 B2
(45) **Date of Patent: *Sep. 7, 2021**

(54) INTERFACE ELEMENTS FOR DIRECTED DISPLAY OF CONTENT DATA ITEMS

(71) Applicant: Google LLC, Mountain View, CA (US)

(72) Inventors: Juan Carlos Anorga, San Francisco, CA (US); Indrajit Khare, Mountain View, CA (US); Madhur Khandelwal, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,130

(22) Filed: Jun. 11, 2020

(65) Prior Publication Data

US 2020/0301959 A1 Sep. 24, 2020

Related U.S. Application Data

(63) Continuation of application No. 15/802,362, filed on Nov. 2, 2017, now Pat. No. 10,691,740.

(51) Int. Cl.

| | |
|---|---|
| ***G06F 3/048*** | (2013.01) |
| ***G06F 16/438*** | (2019.01) |
| ***G06F 3/0482*** | (2013.01) |
| ***G06F 3/0485*** | (2013.01) |
| ***G06F 16/44*** | (2019.01) |

(52) U.S. Cl.

CPC .......... *G06F 16/438* (2019.01); *G06F 3/0482* (2013.01); *G06F 3/0485* (2013.01); *G06F 16/44* (2019.01)

(58) Field of Classification Search

CPC ...... G06F 3/0485; G06F 16/54; G06F 16/438; G06F 16/44; G06F 3/0482

See application file for complete search history.

(56) References Cited

U.S. PATENT DOCUMENTS

2002/0126155 A1* 9/2002 Lin-Hendel ........... G06F 3/0482 715/785
2002/0194161 A1 12/2002 McNamee et al.
2014/0229477 A1* 8/2014 Costello ............. G06Q 30/0256 707/731

OTHER PUBLICATIONS

USPTO, Final Office Action for U.S. Appl. No. 15/802,362, dated Dec. 9, 2019, 14 pages.

(Continued)

*Primary Examiner* — Pei Yong Weng
(74) *Attorney, Agent, or Firm* — IP Spring

(57) ABSTRACT

Implementations relate to relate to interface elements for directed display of content data items. In some implementations, a method includes causing a subset of content elements to be presented in a display view of a graphical user interface on a device, the set of content elements corresponding to a collection of content data items. Search topics are identified based on one or more content characteristics associated with content elements that are within a threshold distance of the subset of content elements in the display view. Topic elements are displayed in the interface, corresponding to the search topics. In response to a selection of a particular topic element based on user input, the collection of content data items is searched to identify resulting content data items that have content characteristics corresponding to the selected search topic. The display view is updated to present resulting content elements.

19 Claims, 10 Drawing Sheets

(56) References Cited

OTHER PUBLICATIONS

USPTO, First Action Interview Office Action Summary for U.S. Appl. No. 15/802,362, dated Sep. 5, 2019, 15 pages.
USPTO, First Action Interview, Pre-Interview Communication for U.S. Appl. No. 15/802,362, dated Jul. 12, 2019, 4 pages.
USPTO, Notice of Allowance for U.S. Appl. No. 15/802,362, dated Feb. 18, 2020, 7 pages.

* cited by examiner

INTERFACE ELEMENTS FOR DIRECTED DISPLAY OF CONTENT DATA ITEMS

CROSS-REFERENCE TO RELATED APPLICATIONS

This application is a continuation of U.S. patent application Ser. No. 15/802,362, filed Nov. 2, 2017 and titled INTERFACE ELEMENTS FOR DIRECTED DISPLAY OF CONTENT DATA ITEMS, the contents of which are incorporated herein by reference in their entirety.

BACKGROUND

The popularity and convenience of digital camera devices have caused visual content such as digital photographs and videos to become ubiquitous. For example, large numbers of images of various types can be captured, stored, and displayed by user devices. Some devices allow a user's images or other content to be displayed in a layout including content items in a collection. Typically, a view of content items are displayed on a screen, and the user may cause the content items to scroll such that different portions of the collection of content items are displayed in the view.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to interface elements for directed display of content data items. In some implementations, a computer-implemented method to provide user-selectable interface elements in a displayed interface includes causing a subset of content elements of a set of content elements to be presented in a display view of a graphical user interface displayed on a device, where the set of content elements has a sequence, and the set of content elements corresponds to a collection of content data items. The method includes identifying one or more search topics based on one or more content characteristics associated with one or more content elements that are within a threshold distance of the subset of content elements in the display view. The method includes causing one or more topic elements to be displayed in the graphical user interface, where the one or more topic elements correspond to the one or more search topics, and receiving a selection of a particular topic element of the one or more topic elements displayed in the graphical user interface, where the selection is based on user input received by the device. In response to the selection of the particular topic element, the collection of content data items is searched to identify one or more resulting content data items that have at least one content characteristic corresponding to a search topic of the particular topic element. The method includes updating the display view to present at least one resulting content element that corresponds to at least one resulting content data item of the one or more resulting content data items.

Various implementations and examples of the method are described. For example, in some implementations, the user input is second user input, and further comprising, prior to causing one or more topic elements to be displayed, detecting first user input received by the device, and causing a change of the display view based on the first user input, where the change of the display view causes a different subset of the set of content elements to be presented in the display view. Identifying the one or more search topics can be performed in response to the first user input.

In some examples, the change of the display view includes a scrolling of the display view, and/or a page flip of the display view. In some implementations, the change of the display view includes scrolling of a plurality of content elements in the display view, where causing the one or more topic elements to be displayed in the graphical user interface is in response to a rate of the scrolling meeting a threshold scrolling rate. In some implementations, the change of the display view includes scrolling of a plurality of content elements in the display view, and the threshold distance is based on a rate of the scrolling. In some implementations, the one or more search topics are a subset of a plurality of search topics identified based on the one or more content characteristics associated with the one or more content elements, where the one or more search topics are determined to have highest priorities of the plurality of search topics. In some examples, at least one search topic of the one or more search topics is assigned at least one of the highest priorities in response to the at least one search topic being based on at least one content element located in a section of the set of content elements that the subset of content elements belongs to. In another example, the one or more search topics are assigned priorities that are based on frequencies of appearance among the one or more content elements of associated content characteristics on which the one or more search topics are based.

In another example, the user input is second user input, and the method includes causing a change of the display view in a view direction relative to the sequence based on first user input, where at least one search topic of the one or more search topics is increased in priority in response to being based on at least one content element that is positioned in the view direction in the sequence. In some examples, the one or more content characteristics are associated with one or more content data items, e.g., images, corresponding to the one or more content elements, where the one or more content characteristics include at least one of: one or more image content features depicted in the one or more content data items, one or more times of creation of the one or more content data items, and one or more locations of capture of the one or more content data items. In some implementations, identifying the one or more search topics is additionally based on a previous user selection of one or more selected content elements of the set of content elements, and/or based on a previous user selection of a prior search topic displayed in the graphical user interface, the prior search topic determined based on at least one content characteristic associated with at least one content element within the threshold distance of a prior subset of content elements displayed in a prior display view of the graphical user interface. In some implementations, the content data items include one or more of: images, videos, audio segments, files, documents, and mixed media content data items.

In some implementations, a non-transitory computer readable medium has stored thereon software instructions that, when executed by a processor, cause the processor to perform operations. The operations include presenting a subset of content elements of a set of content elements in a display view of a graphical user interface on a device, where the set of content elements has a sequence, and the set of content elements corresponds to a collection of content data items. The operations include detecting first user input received by the device, and causing a change of the display view based on the user input, where the change of the display view causes a different subset of content elements of the set of content elements to be presented in the display view. In response to the first user input, one or more search topics are identified based on one or more content characteristics associated with one or more content elements that are within a threshold distance of the different subset of content elements. The operations include causing one or more topic elements to be displayed in the graphical user interface, where the one or more topic elements correspond to the one or more search topics. The operations include receiving a selection of a particular topic element of the one or more topic elements displayed in the graphical user interface, the selection provided by second user input received by the device. In response to the selection of the particular topic element, the collection of content data items is searched to identify one or more resulting content data items that have at least one content characteristic corresponding to a search topic of the particular topic element. The operations include updating the display view to present at least one resulting content element that corresponds to at least one resulting content data item of the one or more resulting content data items.

In some implementations, a system includes a memory and at least one processor configured to access the memory and configured to perform operations including causing a subset of content elements of a set of content elements to be displayed in a display view of a graphical user interface on a device. The operations include detecting first user input received by the device and causing a change of the display view based on the user input, where the change of the display view causes a different subset of content elements of the set of content elements to be displayed in the display view. In response to the user input, one or more acceleration topics are determined that are associated with one or more sections of content elements in the set of content elements, where the one or more acceleration topics are based on one or more characteristics associated with one or more content elements in the one or more sections of content elements. The operations include causing one or more topic elements to be displayed in the user interface, where the one or more topic elements correspond to the one or more acceleration topics. The operations include receiving a selection of a particular topic element of the one or more topic elements displayed in the user interface, where the selection is based on second user input received by the device. The operations include, in response to the selection of the particular topic element, causing the display view to present at least a portion of a section of content elements that corresponds to the particular topic element.

Various implementations and examples of the system are described. For example, in some implementations, the set of content elements has a sequence, where the one or more sections of content elements are positioned within a threshold number of sections of content elements from the display view in the sequence. In some examples, the set of content elements has a sequence, where the one or more acceleration topics include a next acceleration topic that corresponds to a next section of content elements in the sequence with respect to the display view, and the next section of content elements is currently not displayed in the display view.

In some implementations, the at least one processor causes the display view to present the at least a portion of the section of content elements corresponding to the particular topic element by causing a plurality of content elements of the set of content elements to automatically transition within the display view until the section of content elements corresponding to the particular topic is reached. In various examples, the change of the display view includes a scrolling of a first plurality of content elements through the display view, and/or a page flip of a second plurality of content elements through the display view, where the one or more acceleration topics correspond to respective sections of content elements that are located in a sequence in a direction of the change of the display view.

In some implementations, the one or more characteristics of content elements in the corresponding section includes a date associated with the content elements in the corresponding section, where at least one acceleration topic of the one or more acceleration topics includes a first label determined based on the date; a location associated with the content elements in the corresponding section, where the at least one acceleration topic of the one or more acceleration topics includes a second label determined based on the location, and the location associated with the content elements in the corresponding section is a location at which the content elements in the corresponding section were captured; and/or one or more content features depicted in the content elements in the corresponding section. The operations can further comprise determining whether the change of the display view includes a scrolling of a plurality of content elements in the display view at a rate that meets a threshold rate, where the rate is based on the first user input, and causing the one or more topic elements to be displayed is performed in response to determining that the scrolling of the plurality of content elements meets the threshold rate.

DETAILED DESCRIPTION

Figure 1:
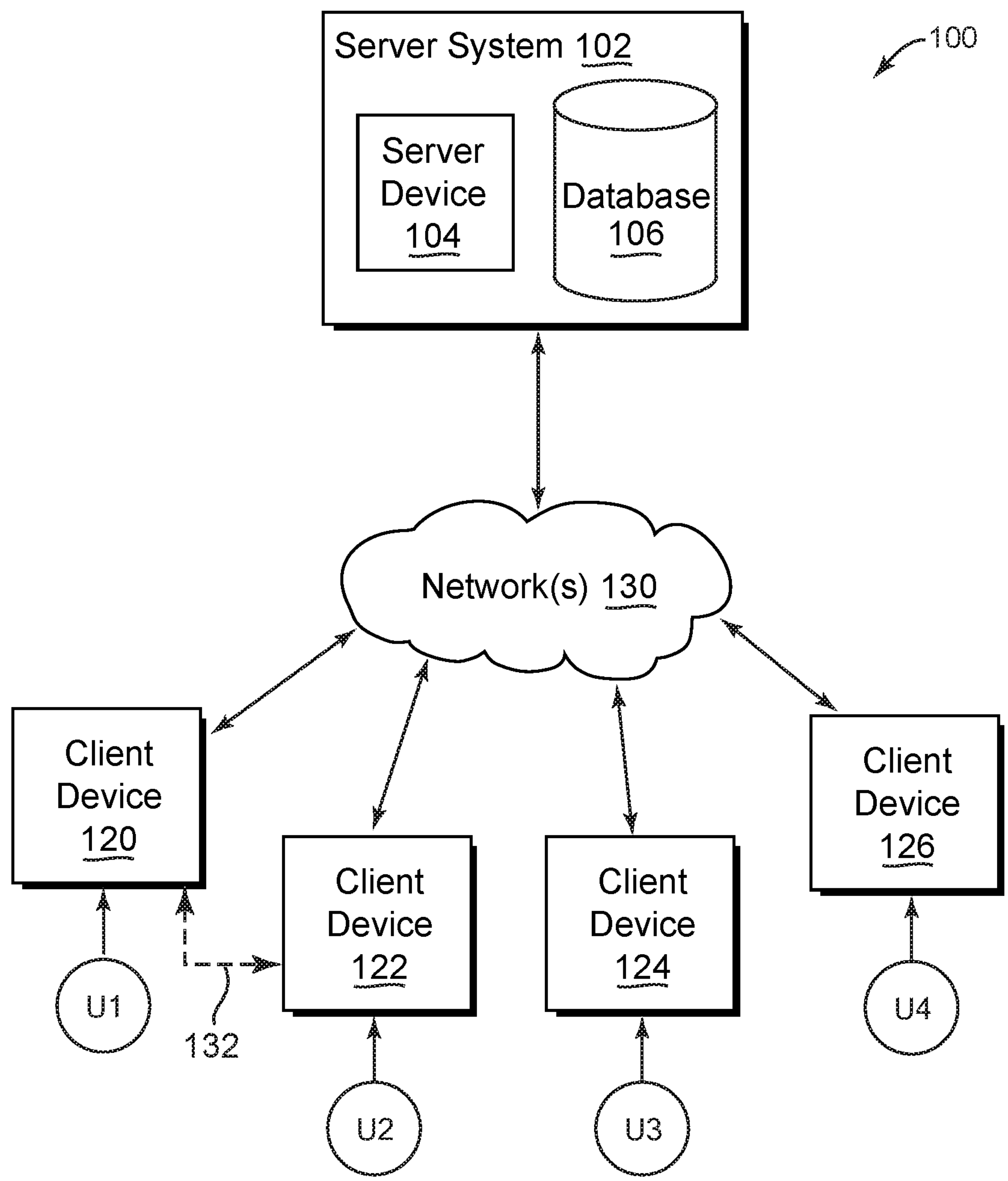
FIG. 1 is a block diagram of example systems and a network environment which may be used for one or more implementations described herein.

One or more implementations described herein relate to display of interface elements for directed display of content elements. In various implementations, a subset of content elements are displayed in a display view of a graphical user interface on a device, where the displayed content elements correspond to content data items of a collection (e.g., images, videos, documents, audio segments, etc). User input can change, e.g., scroll, the content elements displayed in the display view in order to display other portions of a collection of content elements.

In some search topic implementations, in response to the change in the display of the content elements, the device identifies search topics based on content characteristics associated with content elements within a threshold distance of the displayed subset of content elements. Search topic elements that indicate the identified search topics are displayed in the graphical user interface to present suggested search topics. A selection from the user of a particular search topic element causes a search of the collection of content data items to identify resulting content data items that have a content characteristic corresponding to the selected search topic. The display view is updated to present content elements resulting from the search.

In some acceleration topic implementations, in response to the user input, one or more acceleration topics are determined that are each associated with a respective section of content elements. Each of the acceleration topics is based on one or more characteristics associated with content element(s) in the corresponding section of content elements. One or more acceleration topic elements that include identified acceleration topics are displayed in the user interface to present suggested acceleration topics. A selection of a particular acceleration topic element causes the display view to present (e.g., automatically jump to or scroll to) a portion of the section of content elements that corresponds to the selected acceleration topic element.

Various additional features are described. For example, the content characteristics can include content features depicted in the one or more content data items (e.g., persons, objects, activities, or other features depicted in images), times of creation of the content data items, locations of creation of the content data items, etc.

In some implementations, the scroll topic elements and/or acceleration topic elements are displayed in the graphical user interface in response to a rate of the scrolling meeting a threshold scrolling rate, e.g., a fast rate that indicates the user is searching for content elements. Acceleration topics can be based on content elements that are positioned within a threshold number of sections of content elements from the display view.

In some implementations, the displayed search topics and/or acceleration topics are the topics determined to have the highest ranks or priorities of a plurality of topics identified from the content data items. For example, higher priorities or ranks can be assigned to topics based on particular criteria. In some examples, higher priorities can be assigned to topics that are based on content data items located in the same section of content elements in which the displayed subset of content elements is located. Priorities can be assigned to topics based on the frequency of appearance of the characteristics on which the topic are based among the content data items, where, e.g., the most-frequently occurring characteristics provide highest priorities. Higher priorities can be assigned to topics from content data items positioned in a direction of the scrolling of the display view (a forward direction) and lower priorities to topics from content data items positioned away from or opposite to the display view direction (a back direction).

One or more features described herein enable devices to efficiently display a collection of content data items in a content viewing application. Disclosed features allow content elements that represent content data items to be displayed more efficiently based on user input. For example, suggested search topic elements are displayed in a user interface and automatically provide search topics for the user, allowing the user to simply select a search topic element to cause a search of the content data items to be automatically performed by the device based on the selected search topic and cause the search results to be automatically displayed. The provided search topics can be determined from content data items that are within a threshold distance of the current displayed view of content data items, thus providing search topics that may be relevant to the current position of the display view. The provided search topics can be provided based on current scrolling or page-changing rate, and are thus relevant to the current manner of searching by the user. Suggested acceleration topic elements can be displayed to allow a user to select a desired topic and change the display view immediately to the relevant portion of the collection of content data items for display. Acceleration topic elements can be based on sections of content data items that are near to the current position of the display view of content data items, and can be displayed based on scrolling or page-changing rate.

The described suggested topic elements can enable faster and more efficient display of content data items in a user interface, and more efficient interaction of a user with the user interface to locate content data items. For example, display and selection of a displayed search topic element reduces or eliminates the need to display and receive manually-input text or other complex input to specify search queries. Furthermore, the suggested search topics indicate characteristics of nearby or upcoming content data items that are currently not displayed in a view, reducing the time and processing for the display of content data items and reducing the number of manually-specified searches received to find content data items. Acceleration topics indicate off-screen content characteristics and selection of these topics allows fast and efficient display of desired content data items, saving display processing and time. Topic elements may enable commands to be input to a content viewing program quickly and easily, and can be additionally useful when a client device lacks easy, simple, or any text input functionality (e.g., a smartwatch that does not include a keyboard or microphone). Such features allow interaction with a content display program with reduced user input and reduced time, thus reducing consumption of device resources that would otherwise be needed to process and receive user input and display results in such programs.

Consequently, a technical effect of one or more described implementations is that display of content data items in user interfaces is provided with less computational time and fewer computational resources expended to obtain results. For example, a technical effect of described techniques and features is a reduction in the consumption of system processing resources utilized to display particular content data items as compared to a prior system that does not provide one or more of the described techniques or features. For example, such a prior system uses prior techniques of receiving manual search queries as text, in which additional computational resources, such as display and search processing and power consumption, are needed to display several iterations of search results as the user determines which search queries are relevant to existing content data items. In another example, a technical effect of described techniques and features is a reduction in the consumption of system processing resources, such as display and search processing and power consumption, utilized by a system that does not provide one or more of the described techniques or features. For example, in such a prior system, the user manually scrolls a view of content elements using a swipe gesture, scrubber, or scrollbar control, and the user must manually locate desired content items via such manual scrolling, leading to inefficient use of system resources (e.g., repeated display and scrolling of content data items in forward and back directions, repeated reception of commands from users to display and/or search for content items, etc.).

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

An image, as referred to herein, is a digital image having pixels with one or more pixel values (e.g., color values, brightness values, etc.). An image includes image data that is a digital representation of an image, such as a pixel map or other representation of an image including numeric values (pixel values) stored in a file and usable to render an image in an electronic display. An image can be a still image or single image, or can be an image included in a series of images, e.g., a frame in a video sequence of video frames, or an image in a different type of sequence or animation of images. A video includes a sequence of multiple images. For example, implementations described herein can be used with content data items that are single images or static images (e.g., a photograph, an emoji, or other image), videos, or animated images (e.g., cinemagraphs or other animated image that includes motion, a sticker that includes animation and audio, etc). Text, as referred to herein, can include alphanumeric characters, emojis, symbols, or other characters. An audio segment can include audio data that is provided in a standard audio format which can be processed to provide sound, e.g., from speakers.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service, or other type of network service, implemented on server system 102. For example, respective client devices 120, 122, 124, and 126 may communicate data to and from one or more server systems (e.g., system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications.

In some examples, the network service can include any system allowing users to perform a variety of communications, form links and associations, upload and post shared content such as images, image compositions (e.g., albums that include one or more images, image collages, videos, etc.), audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text videoconferences or chat with other users of the service, etc. In some implementations, a "user" can include one or more programs or virtual entities, as well as persons that interface with the system or network.

In some implementations, server system 102 and/or one or more client devices 120-126 can provide a display content program. The display content program may allow a system (e.g., client device or server device) to display content elements in a particular layout (e.g., based on a grid), some examples of which are described herein.

A user interface can enable display of content elements for content data items, as well as enable content for communications, privacy settings, notifications, and other content on a client device 120, 122, 124, and 126 (or alternatively on server system 102). Other applications can also be used with one or more features described herein, such as browsers, email applications, communication applications, etc. Such a user interface can be displayed using the display content program or other software on the client device, software on the server device, and/or a combination of client software and server software executing on server device 104, e.g., application software or client software in communication with server system 102. The user interface can be displayed by a display device of a client device or server device, e.g., a display screen(s), projector, etc. In some implementations, application programs running on a server system can communicate with a client device to receive user input at the client device and to output data such as visual data, audio data, etc. at the client device. In some implementations, a client device 120-126 may provide one or more suggested topics to users via a user interface, e.g., as displayed topic elements such as a button or other user interface element. For example, the user interface may provide various options to a user to cause the display of content elements to view, select content elements, etc. Suggested topics may enable users to command display of particular content data items or elements when the user selects a suggested topic as described herein.

In some implementations, server system 102, one or more client devices 120-126, and/or other components of the network environment 100 can use machine learning, e.g., use a machine learning model that utilizes machine learning to determine suggested search topics and/or acceleration topics from characteristics of content data items. For example, in a training stage, a device can be trained using training data (e.g., content data item training data), and then at an inference stage can determine suggested topics based on content data items input to the model. For example, the machine learning model can be trained using data from human operators indicating appropriate descriptions of content features detected in content data items. In some implementations, the machine learning model can be trained based on sample data, e.g., sample content data items, for which permissions to utilize user data for training have been obtained expressly from users providing the message data. For example, sample data may include content elements or content data items that are selected by the user. Based on the sample data, the model can determine suggested topics. Some examples of machine-learning techniques are described below with reference to FIG. 12.

In some examples, the network environment 100 can detect content characteristics of content data items and determine suggested topics based on the content characteristics. For example, image features can include people (without determining identity of the people), animals, objects (e.g., articles, vehicles, etc.), particular monuments, landscape features (e.g., foliage, mountains, lakes, sky, clouds, sunrise or sunset, buildings, bridges, etc.), weather, etc. Various image recognition and detection techniques can be used (e.g., machine learning based on training images, comparison to reference features in reference images, etc.) to detect image content features. Some implementations can detect audio content features in audio segments, and determine suggested topics based on the image features. Audio content features can include voice features, sound effects, etc., where the source of such audio features can be recognized and provided as a suggested topic (e.g., recognizing a sound of rain, a train, a human voice, a dog growl, etc.).

In some implementations, one or more devices of network environment 100, e.g., one or more servers of the server system 102, may maintain an electronic encyclopedia, a knowledge graph, one or more databases, a social network application (e.g., a social graph, a social network for friends, a social network for business, etc.), a website for a place or location (e.g., a restaurant, a car dealership, etc.), a mapping application (e.g., a website that looks up map locations), etc. In some implementations, server system 102 may include classifiers of particular types of content data items (e.g., images), and can determine whether any of particular classes are detected in the content data items (e.g., pixels of an image).

Various implementations of features described herein can use any type of system and/or service. For example, social networking services, image collection and sharing services or other networked services (e.g., connected to the Internet) can include one or more described features accessed by client and server devices. Any type of electronic device can make use of features described herein. Some implementations can provide one or more features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
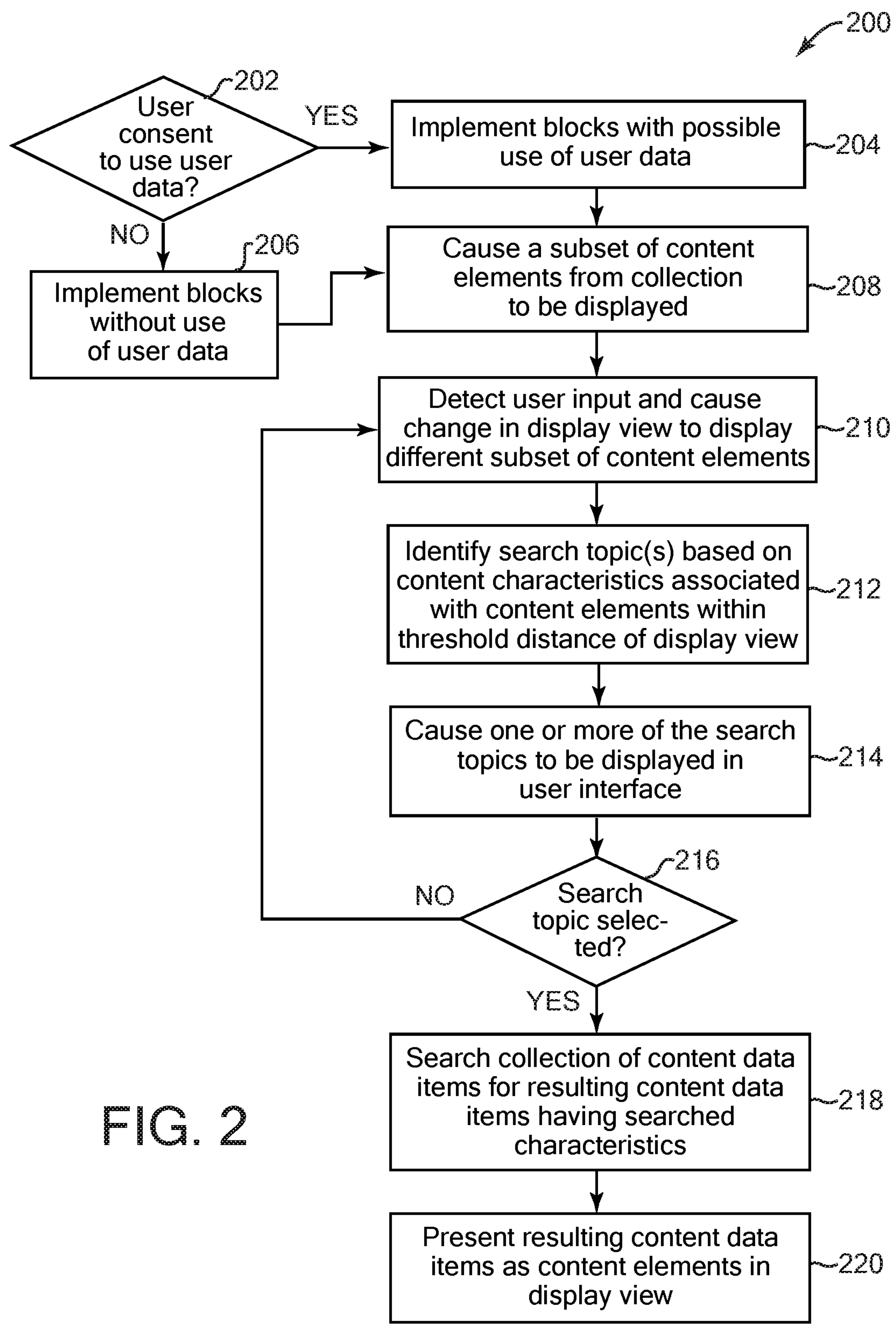
FIG. 2 is a flow diagram illustrating an example method to provide suggested interface selections to search for content data, according to some implementations.

FIG. 2 is a flow diagram illustrating an example method 200 to provide suggested interface selections to search for content data, according to some implementations. In some implementations, method 200 can be implemented, for example, on a server system, e.g., messaging server 101, as shown in FIG. 1. In some implementations, some or all of the method 200 can be implemented on a system such as one or more client devices 120-126 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 200.

Some implementations can initiate method 200 based on user input. A user may, for example, have selected the initiation of the method 200 from a displayed user interface. In some implementations, method 200 or portions thereof can be performed with guidance by the user via user input.

In some implementations, the method 200, or portions of the method, can be initiated automatically by a user device. For example, the method (or portions thereof) can be periodically initiated, or initiated based on the occurrence of one or more particular events or conditions. For example, such events or conditions can include a particular application being opened based on user input, obtaining one or more images or other content data items that have been newly captured/created by, uploaded to, or otherwise accessible by a user device, a predetermined time period having expired since the last performance of method 200, and/or one or more other events or conditions occurring which can be specified in settings of a device implementing method 200. In some implementations, such conditions can be previously specified by a user in stored custom preferences of the user (accessible by a device or method with user consent). In some examples, a device (server or client) can perform the method 200 with access to a collection of accessible content data items, e.g., a user's collection of content data items (if user consent is received). In another example, a camera, cell phone, tablet computer, wearable device, or other client device can capture one or more content data items such as images, videos, audio segments, etc., and can perform the method 200. In addition, or alternatively, a client device can send one or more content data items to a server over a network, and the server can process the content data items using method 200.

In block 202, it is checked whether user consent (e.g., user permission) has been obtained to use user data in the implementation of method 200. For example, user data can include user preferences, user biometric information, images or other content data items in a content collection (e.g., images captured, uploaded, generated, received, accessed, or otherwise associated with a user), messages sent or received by a user, information about a user's social network and/or contacts, user characteristics (identity, name, age, gender, profession, etc.), social and other types of actions and activities, content, ratings, and opinions created or submitted by a user, a user's geographical location, historical user data, etc. One or more blocks of the methods described herein may use such user data in some implementations.

If user consent has been obtained from the relevant users for which user data may be used in the method 200, then in block 204, it is determined that the blocks of the methods herein can be implemented with possible use of user data as described for those blocks, and the method continues to block 208. If user consent has not been obtained, it is determined in block 206 that blocks are to be implemented without use of user data, and the method continues to block 208. In some implementations, if user consent has not been obtained, the remainder of method 200 is not performed, and/or particular blocks using the user data are not performed. In some implementations, if user consent has not been obtained, blocks of method 200 are to be implemented without use of user data and with generic or publicly-accessible and publicly-usable data.

In block 208, a subset of content elements of a set of content elements are caused to be displayed in a display view on a user device. Each content element can be a displayed representation of corresponding content data. The subset (or portion, e.g., "view subset" or "view portion") of the set of content elements is rendered in the display view of the device. For example, the display view can be a portion of an area of a display screen (or the entire area of the display screen) of a user device. In some implementations, the display view is an area (e.g., a window) of a user interface that is displayed by the user device. In some implementations, the display view is provided on a display screen of a mobile device, e.g., a mobile phone, tablet, goggles or glasses, etc. For example, the mobile device can be any of client devices 122, 124, 126, or 128. In additional examples, the display view can be an area of a display screen of a non-portable device, e.g., a display monitor in communication with a desktop computer or other non-portable device.

The set of content elements corresponds to (e.g., visually represents) content data. For example, each content element can correspond to (and/or can be generated based on) a content data item of a collection of content data items. The content data items corresponding to the displayed content elements can be any of a variety of types of content. For example, the content data items can include images, videos, animated images (e.g., animated GIFs or cinemagraphs), audio segments, documents (e.g., including text and/or other types of content), files, mixed media content data items, etc. The content data items can be stored on one or more storage devices and may be accessible to the method 200.

A content element displayed in the display view of the user interface is a visual representation that can indicate the type and/or content of the corresponding content data item. In some examples, a content element can be displayed as a text label, a pictorial icon, a thumbnail (lower-resolution) image version of the corresponding content data item (e.g., for image and video content data items), a portion of the corresponding content data item (e.g., a portion of an image), etc., and/or a combination of two or more of these. For example, a displayed content element may be an image that is a lower pixel-resolution version ("thumbnail") or icon that corresponds to and is generated from a content data item that is an image that has, e.g., an original or higher pixel resolution, or corresponds to and is generated from a content data item that is a video (e.g., a lower resolution image of a representative frame of the video). Each content data item has one or more characteristics, and a content element corresponding to a content data item is associated with the one or more characteristics of the corresponding content data item. In some implementations, a content element can represent a group of multiple content data items, e.g., a content data group such as an image album that includes multiple images. Content elements representing such groups of content data items can be visually distinguished from content elements that represent single content data items.

The set of content elements and the corresponding collection of content data items can be stored in accessible storage, e.g., local storage to the device performing method 200, and/or remote networked storage accessible over a network. In some examples, the set of content elements and/or the collection of content data items can be received from a different device and/or user over a network connection.

The set of content elements, or a portion of the set, can be arranged in a particular sequence, e.g., for display. For example, the content elements in the set can be organized based on one or more characteristics of their corresponding content data items. In some examples, the set of content elements can be organized in a sequence. The sequence can be based on characteristics including time of creation of the corresponding content data items (e.g., time of capture of an image or video, time of creation of a document, etc.) to provide a chronological sequence. In some examples, content elements of the most recently created content data items are provided first in the sequence, and content elements of the least-recently created content data items are last in the sequence. Alternatively, the sequence can be the opposite order of this time order.

In some implementations, the set sequence or order can be based on additional or alternative characteristics. In some examples, the sequence can be based on, e.g., alphabetical ordering based on the first letter of text labels associated with the content elements, such as labels providing a description of content features in corresponding images, a filename of a file encapsulating the corresponding content data item, a label describing a location where the corresponding content data item was created (e.g., captured), etc. As referred to herein, a location can be a particular geographic area. The sequence can be based on time of last modification of the corresponding content data items; time when the corresponding content data items were received by the user's account or device; time when the content data items were added to the collection, etc. The sequence can be based on the type of content data item (e.g., certain types ordered first, such as cinemagraph, image, video, audio segment); based on the types of content features detected in the corresponding content data items (e.g., people first, landscapes next, etc.); and/or based on the users who created the content data items.

In some examples, the sequence can be stored in accessible storage. For example, a list of identifications of the content data items in the sequence can be stored, including designations of the sections in which the content data items are included, the section labels for the sections, etc.

In some implementations, the set of content elements can be organized into multiple sections that are provided in a particular sequence, each section including one or more of the content elements. The content elements in each section can be organized according to the same or a different sequence, e.g., based on the same or different characteristics of the corresponding content data items. For example, the set of collection elements can be organized into multiple months provided in a time sequence (e.g., newest to oldest). The content elements of content data items within each month (e.g., having a time of creation within the associated month) can be provided in a different sequence based on, e.g., other content characteristics as described above.

The subset of content elements can be displayed in the display view in a particular layout. For example, the subset of content elements can be arranged in a grid of rows and columns. Some examples of the display of the subset of content elements are described below with respect to FIGS. 6-13. In additional examples, the subset of content elements can be displayed in a single column (e.g., in a size such that the content elements have a width that fits the width of the display view), a single content element at a time, a layout in which some content elements are displayed larger than other content elements (e.g., based on characteristics of the corresponding content data items such as time of creation, detected content features, location of creation, etc.), or other type of layout. The method continues to block 210.

In block 210, input can be detected and a change in the display view is caused based on the input, to present a different subset of content elements of the set of content elements in the display view. In some implementations, the input can be received from a user, e.g., as user input provided via an input device such as a touchscreen, keyboard, buttons, trackpad, joystick, pointing device such as a mouse or trackball, etc. In various implementations, the change in the display view can be a directed change in the subset of content elements displayed in the display view, e.g., in a particular direction of the sequence of the set of content elements (e.g., view direction). For example, the view direction can be forward in the sequence, or back in the sequence.

In some examples, the directed change can be scrolling of one or more content elements, or portions thereof, into and out of the display view. For example, the scrolling can be in a vertical direction of a display screen that displays the display view, e.g., forward or back. In a forward direction example, content elements displayed at the top of the display view are displayed to move up, across the top border of the display view, and out of the display view (no longer displayed on the display screen), and content element(s) next in the sequence of the set of content elements are moved up into the display view from the bottom border of the display view. In other implementations, the forward direction can be the reverse of this movement. In some implementations, the forward direction can move displayed content elements out of the view via a left border of the display view and can move other content elements into the view via the right border of the display view (or the reverse of this movement can be used for the forward direction). A back direction can move content elements in the opposite direction to the forward direction. In some examples, a plurality of content elements of the set can scroll through the display view while the input indicates to continue the scrolling. The scrolling movement can be animated to be smooth, or can omit positions between starting and ending positions of the content elements.

In another example, the change in the display view can be a page flip of one or more content elements into and out of the display view, e.g., in a forward or back direction of the sequence. The page flip can remove the displayed subset of content elements from the screen and immediately (or over time, e.g., in a fade process) replace this removed subset with a different subset of content elements that are, e.g., the next in the sequence of the set of content elements (for a forward direction) or are the immediate previous subset of content elements in the sequence (for a back direction). For example, the size of the display view can be considered a page of displayed content elements, and the next or previous subset of content elements that visually fits in the display view can be considered the next or previous page of content elements, respectively. The method continues to block 212.

In block 212, one or more search topics are identified based on one or more content characteristics (e.g., one or more types of content characteristics) associated with content elements within a threshold distance of the display view. For example, the content characteristics are of content data item(s) that correspond to content element(s) within a threshold distance of the subset of content elements displayed in the display view, e.g., displayed at (or after) the time of the change in the display view.

In some implementations, block 212 can be performed (e.g., triggered) in response to particular conditions occurring in the user interface. In some implementations, block 212 can be performed when method 200 is initiated, and/or in response to other conditions and/or user input. For example, block 212 can be performed in response to the change in the display view of block 210. These and other examples are described with reference to FIG. 3.

Particular content data items (e.g., eligible content data items) in the collection of content data items are searched to determine search topics for block 212. In this example, the content data items that are searched correspond to content elements that are within a threshold distance of the subset of content elements in the display view. In various implementations, the threshold distance can be a particular number of pages or screens worth of content elements in the forward and/or back directions in the sequence of the content elements in the set of content elements, as described below with reference to FIG. 3. In some implementations, all the content data items in the collection of content data items are searched to determine search topics, or particular portions of the collection are searched, e.g., based on user preferences, time of creation of content data items (e.g., content data items captured or otherwise created within a particular time period of the present time), location of capture or creation of the content data items, etc. For example, in some implementations, a threshold range of eligible content data items can be based on a characteristic of the content data items, such as the time of creation of content data items, the location of creation of content data items, etc. In some examples, the threshold range can be content data items that were created within one week, six months, 10 years, etc., of the current time, and/or content data items that were created at a location that is within a particular geographical distance of a current location of the device implementing method 200 (e.g., as determined based on device sensors such as GPS sensors).

The content data item characteristics used to determine the search topics in block 212 can be any of a variety of different characteristics. For example, the characteristics can include content features depicted in the searched content data items or otherwise represented in the searched content data items, the time of creation of content data items, locations associated with content data items, activities depicted by the content data items, or other characteristics. Some examples are described below with reference to FIG. 3. The method continues to block 214.

In block 214, one or more of the search topics identified in block 212 are caused to be displayed by the user device. For example, search topics can be displayed in the user interface that includes the display view presenting a subset of content elements. In some implementations, the displayed search topics can be visually associated with (e.g., displayed in) interface elements ("topic elements" or "search topic elements") that are displayed in the user interface. For example, the topic elements can be graphical buttons or boxes in which text is displayed, where the text provides the search topics. Some examples of topic elements that correspond to search topics are described below with reference to FIGS. 6-9. If no search topics were identified in block 212 (e.g., described for FIG. 3), then block 214 is omitted. The method continues to block 216.

In block 216, it is checked whether at least one search topic is selected from the one or more search topics displayed in block 214. For example, user input provided to the user interface can select a displayed topic element that corresponds to a search topic. In some examples, the user can select a topic element displayed on a touchscreen of the user device, or select the topic element using a different input device. If no search topic is selected as determined in block 216, the method continues to block 210 to receive input causing change in the display view to display a different subset of content elements (if applicable) and to identify search topics if such a change has occurred (if no such change has occurred, any previously-identified search topics can continue to be displayed in block 214).

If a search topic is selected as determined in block 216, the method continues to block 218, in which the collection of content data items is searched for resulting content data items that have at least one content data item characteristic that is associated with or corresponds to the selected search topic. For example, the selected topic element can include text, and this text is used as a search term for searching the collection of content data items. For example, the collection of content data items is searched for content data items having one or more characteristics associated with the search topic as determined by stored associations between the search topic and content data item characteristics, machine learning models, etc. In some examples, if the topic element has the search topic "sailing," then the collection of content data items is searched for content data items having a matching text tag of "sail" that describes the content of the content data item, and/or tags including other terms determined to be associated with or similar to the search topic, e.g., a term "boat" or other terms semantically related to the search topic. The content data items can be examined to detect content features and to generate appropriate text tags, e.g., detecting content features such as boats or ships, lakes, boat sails, etc. Other characteristics of content data items that can be searched for matches include time of creation, location of creation, device characteristics of the device that created (e.g., captured) content data items, identifications of users that created or are otherwise associated with content data items (if user consent has been obtained), etc.

In block 220, the resulting content data items that resulted from the search performed in block 216 are presented (e.g., displayed) as corresponding resulting content elements in the display view of the user interface. For example, the display view is updated with the resulting content elements. In some implementations, the resulting content elements can be displayed in the view in place of the previous subset of content elements displayed in the display view. In some implementations, the resulting content elements can be displayed in a new or separate view or window in the user interface or in a different user interface provided on the user device. In some implementations, the resulting content elements can be displayed in response to receiving user input, such as a command, that requests the resulting content elements be displayed.

Figure 3:
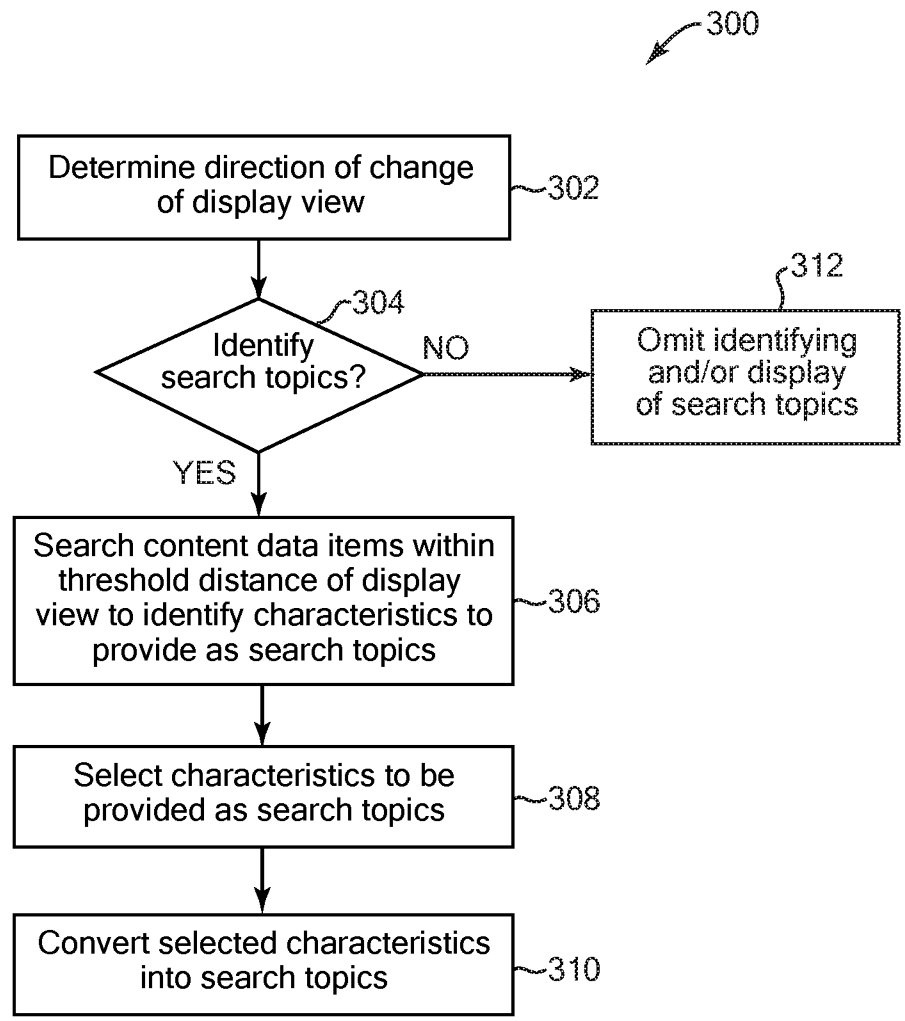
FIG. 3 is a flow diagram illustrating an example method to identify topics based on content data items, according to some implementations.

FIG. 3 is a flow diagram illustrating one example method 300 to identify search topics based on content data items. For example, method 300 may be used to implement block 212 of the example method 200 of FIG. 2. In some implementations, method 300 can be performed in association with a user interface that displays a subset of content elements in a display view that correspond to content data items, as described for FIG. 2. User consent is obtained for the blocks, similarly as described for FIG. 2.

In some implementations, the set of content elements is arranged in multiple different sections, e.g., based on time of creation of the corresponding content data items, location of creation, type of depicted content features, the user that created the corresponding content data items, and/or other criteria. The subset of content elements displayed in the display view is in a particular section of the set of content elements, and may be in multiple different sections if the subset spans multiple such sections.

In block 302, a direction of change of the display view (view direction) may be determined with respect to the sequence of the set of content elements. For example, in some implementations as described above, the direction of change can be forward or back in the sequence. In some examples, the change in of the display view is scrolling or a page flip to display the different subset of content elements, e.g., in response to received user input.

In block 304, it is determined whether to identify search topics in the collection of content data items. In some implementations, the identifying can be performed (e.g., triggered) in response to particular conditions occurring in the user interface. In some implementations, the identifying can be performed when method 200 of FIG. 2 is initiated, and/or in response to other conditions and/or user input. For example, the identifying can be performed in response to the change in the display view of block 210 of FIG. 2. Such a change can, for example, be instructed by user input provided by a user.

In some implementations, the identifying is performed in response to the directed change in the display view meeting a threshold rate of change. For example, the change in the display view can be scrolling and it is checked whether the scrolling meets a threshold rate of scrolling (e.g., scrolling speed). In some implementations, the change in display view can be page flipping to a different subset of content elements, and the rate of page flipping can be determined if it meets a threshold rate of page flipping (e.g., a threshold number of pages of content elements being sequentially displayed in the display view within a particular timespan).

In additional examples, the identifying of search topics can be performed in response to other conditions. The conditions can include a particular period of time passing after the display view is first presented by the user device, and/or periodically after every such period of time passes. In additional examples, the identifying of search topics can be performed in response to a message from another user being received at the user device over the network while the display view is presented (e.g., the message identifying or including a topic that is used as a search topic), in response to an event occurring as based on the user's stored calendar or to-do list, in response to a selection of a content element (e.g. by user input), and/or in response to returning to a display of the subset of content elements after a display of a single content element (e.g., based on user input).

If it is determined to identify one or more search topics in block 304, the method continues to block 306, in which the content data items corresponding to content elements within a threshold distance of the subset of content elements in the display view (e.g., eligible content data items) are searched to identify characteristics to provide as suggested search topics. In various implementations, the threshold distance can be a particular number of sections, pages, or screens of content elements in the forward and/or back directions in the sequence of the content elements in the set of content elements. For example, each page or screen can be the amount of content elements displayable simultaneously in the display view, based on the current display size of the view and the current display size of the content elements (and where these sizes are modifiable, e.g., based on user input). In some implementations, the threshold distance can be a threshold number of content elements in the forward and/or back directions in the sequence of the set of content elements.

The threshold distance can be referenced from (e.g., relative to) the current content elements displayed in the display view. For example, the threshold distance can be referenced from the last content element currently displayed in the display view in the forward direction, and/or from the first content element in the display view in the back direction, or from the current section of the set of content elements in which the display view is positioned. In some implementations, the eligible content data items that are searched to determine search topics are content data items that do not correspond to content elements being currently displayed, e.g., the search content elements/items are located outside the current display view.

In some implementations, the threshold distance is referenced from the current content elements displayed in the display view, and/or the current section in which those content elements are positioned, which are the content elements displayed after the change in the display view of block 210. In other implementations, the threshold distance can be referenced from a different displayed subset, e.g., a previous subset of content elements displayed in the display view, such as the subset of content elements in the display view in block 208 prior to the change of the display view in block 210.

In some implementations, the threshold distance can be in a particular direction ("search direction") in the sequence of the set of content elements, e.g., forward or back. In such implementations, content data items that correspond to content elements in the search direction are searched for search topics. The search direction can be based on the view direction of the change in the display view that was determined in block 302. For example, the search direction can be the same as the view direction, such that search topics are searched for in a portion of the collection of content data items that corresponds to a portion of content elements toward which the user input is moving the view. In some implementations, the search direction can be the opposite direction to the view direction. In some implementations, the search direction can be multiple directions (e.g., forward and back directions). In some of these implementations, search topics based on content data items that are in the view direction are assigned a greater priority or rank than content data items in other directions. Priority or rank can be used in determining which search topics are displayed in the graphical user interface, as described below.

In some implementations, the threshold distance can vary based on the current position of the display view in the sequence of content elements. For example, in some implementations, the threshold distance can be designated to be limited to the current section in which the display view is located (e.g., not extend past the current section). In further examples, the threshold distance, and/or the group of eligible content data items to search for search topics, can be dependent on the number of content elements in the current section in which the display view is located, and/or dependent on the number of content elements in the current section ahead of the display view in the view direction. In some examples, if the display view is currently positioned in an initial portion of the current section of content elements in the view direction (e.g., the first half of the section, such that at least half of the content elements are ahead of the display view), and/or there is greater than a threshold number of content elements ahead of the display view in the current section (in the view direction), then the threshold distance can be limited to the current section in which the display view is located. However, if these conditions do not apply, then the threshold distance can extend to one or more following sections of content elements. For example, if the display view is positioned in a later portion of the section, or if there are fewer than the threshold number of content elements ahead of the display view in the current section, then the threshold distance can be extended to a portion of, or the entire, next section of content elements in the sequence. This can allow a larger number of content items to be searched for topics when the display view is near the end of a section.

The characteristics of content data items that are used to provide the search topics can be any of a variety of different characteristics. For example, the characteristics can be identifications of content features depicted in the searched content data items or otherwise represented in the searched content data items. In some examples, the characteristics can include identifications of content features or content feature types, such as persons, objects, animals, monuments, landscape features (e.g., sky, sunset, mountains, trees, etc.), activities, etc. in visual content data items such as images and videos, if user consent has been obtained to perform such detection. For example, the names of generic objects such as "car", "boat", "tree", "ball", "building", etc. can be detected in the content data items as content feature characteristics. Proper names of detected objects can be used in some implementations, e.g., the Eiffel Tower for monuments, the Grand Canyon, etc.

In additional examples, the names of persons who are detected as being depicted in the content data items can be determined as content feature characteristics, if consent of the user has been obtained to perform and use such detection, based on historical data indicating such detection, tags or other descriptions of users associated with accessible images or other data, etc. In some implementations, generic features such as smiling faces can be detected in the searched content data items and a characteristic of "smiling face" can be thus identified. In further examples, the weather conditions depicted in content data items can be identified as content feature characteristics, such as "rain," "snow", etc., or "winter" if snow is detected, "summer" if bright sunshine is detected, etc. Such detected features can be determined as text words (e.g., tags). In various implementations, techniques for detecting content features can include comparing content data to reference data, and/or using machine learning models that have been trained with training data, some examples of which are described below.

In further examples, the searched and identified content data item characteristics can include the time of creation of content data items, e.g., a time, date, month, season, holiday, etc. For example, a time of capture of image content data items and video content data items can be identified and provided as a content characteristic, such as "May 1, 2016," "Winter," "Halloween," etc. In some implementations, the name of an event can be determined by looking up a particular time of creation in an accessible database or user data (if user consent has been obtained). For example, a characteristic of "company picnic" can be determined based on a time of capture of an image and based on data in the user's calendar indicating that a company picnic occurred at that time. In another example, the names of two sports teams depicted in an image can be obtained by accessing an online sports database or information source based on the date of the image and the location of capture of the image, and these team names can be identified as content characteristics.

In additional examples, the searched and identified content data item characteristics can include locations associated with content data items, e.g., a location that the content data item was created (e.g., captured). For example, geographic coordinates can be associated with content data items (e.g., as metadata), which indicate the location at which these content data items were created. Location names can be determined using map data or other database data that is accessed based on the geographic coordinates, and these location names can be identified as content characteristics. For example, a location characteristic of "India" can be determined based on such location information, as well as more detailed information about the location, e.g., the region, city, business, or other more particular location name where the content data item was captured. In additional examples, location of creation may be available based on other data if user consent has been obtained, e.g., data indicating device location that captured the content data item. In some implementations, location of creation can be determined based on content features detected in the content data item. For example, if a monument or other distinguishable landscape feature is detected in the pixels of an image, the location of capture of the image can be determined.

In additional examples, the search and identified content data item characteristics can include activities depicted by the content data items. For example, if a boat on water is detected in an image content data item, then an activity associated with the detected boat can be identified as a content characteristic, e.g., "sailing." In some implementations, the associated activity can be determined from an accessible database or knowledge base that can store such associations, e.g., in a data structure, lookup table, etc. In some implementations, a trained machine learning model can be accessed, e.g., provided with a content data item as input such that the machine learning model provides an inference based on the content data item. The machine learning model has been trained to provide descriptions of associated activities based on image content such as objects depicted in the content data items.

In additional examples, the searched and identified content data item characteristics can include other characteristics, e.g., particular device or type of device used to capture or create the content data item (e.g., a mobile phone, camera, etc., as indicated in metadata of the content data item); the camera or device settings used when creating the content data item (e.g., exposure, focus, and other settings), modifications to content data items and/or whether content data items have been modified by the user (e.g., cropped or resized an image, changed brightness, contrast, etc., as indicated by metadata) where the characteristic can be designated in a text term (e.g., "modified," "cropped," or other similar text description); whether content data items were received from a different user's device (as indicated in metadata) where the characteristic can be designated in a text term (e.g., "Username" or other indicator of the user); a title of a group of content data items such as an album (if a content element represents such a group); etc. In some implementations, if user consent has been obtained, context data can be received by method 300 from a prior application used by the user on the user device, e.g., data from messages or a chat conversation that can provide words or other data that can be used to search for matching characteristics in content data items.

In some implementations, content characteristics of particular types can be identified in block 306. For example, block 306 can be designated to search and identify three types of characteristics: one or more location characteristics, one or more content feature characteristics, and one or more time of creation characteristics in the eligible content data items. In some implementations, block 306 can be designated to identify multiple types of characteristics such as one or more person content features and one or more activity or object content features in the eligible content data items. In some implementations, one of each type of characteristic is selected for use as a search topic, as described below in block 308.

In some implementations, an individual rank is assigned to each of multiple characteristics found for eligible content data items, e.g., content data items within the threshold distance of the displayed subset of content elements. A rank can be based on a variety of criteria. In some implementations, the ranking criteria can include whether the characteristic was found ahead of the display view (in a forward direction based on the view direction) or behind the display view in the sequence (in a back direction), such that characteristics in the forward direction have a greater rank than characteristics in the back direction. In some examples, the criteria can include the number of content data items that include the characteristic in the searched content data items (e.g., within the threshold distance). For example, characteristics that were identified in the largest number of eligible content data items can be given the highest ranks.

In additional examples, the ranking criteria can include specific types of characteristics that provide a higher rank than other types of characteristics. For example, time of creation characteristics may be assigned a higher rank than content feature characteristics (such as descriptions or tags of objects detected in images), and content feature characteristics may be assigned a higher rank than location characteristics. In additional examples, the criteria can include higher ranks assigned to particular sub-types of characteristics within a type of characteristic. For example, particular types of detected content features (e.g., faces depicted in images) can be assigned a higher rank than other types of detected content features (e.g., landscape features depicted in images).

In additional examples, the ranking criteria can include the frequency of accesses, searches, views, shares to other user device, or other past activity of the user involving content data items that include the characteristic, as indicated by stored history data describing these activities, if user consent has been obtained to access and use such data. For example, a higher rank can be assigned to a characteristic of content data items that have a higher frequency of such activity. In additional examples, the ranking criteria can include the total number of content data items in the collection that include the characteristic, such that greater numbers are associated with higher ranks.

In additional examples, the ranking criteria can include a confidence level of detecting or recognizing the characteristic in content data items. For example, if a particular image feature has been detected using image recognition techniques and there is a low confidence level that the image feature has been correctly recognized in images (as indicated by such techniques), this image feature can be assigned a lower rank than an image feature having a higher level of confidence in its recognition or detection. Similarly, a location that has been detected with a lower confidence level can be assigned a lower rank than a location that has been detected with a higher confidence level. For example, locations obtained via metadata associated with the content data item (e.g., as provided by GPS sensors of the user device) can be assigned higher rank than locations obtained by detecting features in the content data item. In additional examples, persons detected in content data items (with user consent) that have an associated name can be assigned a higher rank than detected persons for whom names are unknown by the system. In some implementations, detected persons who are matched with users who have communicated with the user device (or are present in a contact list of the user device) can be assigned higher ranks than detected persons who are not such users, where stored data indicating such users is accessed by the system with user consent.

In some implementations, a total rank can be determined for each characteristic found, where the total rank is a combination (e.g., sum) of rank modifiers that are determined based on multiple of the criteria.

In some implementations, the section(s) in which the subset of content elements is situated is prioritized for the search of search topics in block 306, or can be the only portion of the collection of content data items that is searched for search topics. For example, the subset of content elements in the display view can be in a section labelled "May, 2017" that corresponds to a portion of the collection of content data items that includes all the content data items of the collection that were captured or otherwise created in that particular month, and that portion of the collection is searched for search topics. In some implementations, if a threshold number of search topics that have a threshold rank are not identified in the searched portion of content data items, then the search can be extended to additional content data items of the collection, e.g., to the next section of content elements in the sequence, until the threshold number of search topics having the threshold rank are identified.

In block 308, particular content characteristics that will be used as suggested search topics in the user interface are selected from the identified characteristics. For example, the selected content characteristics can be used for the search topics identified for display in block 212 of FIG. 2. The selected content characteristics may be a subset of characteristics from a group of content characteristics that was identified from content data items, e.g., in block 306. For example, a top number of highest ranking content characteristics can be selected, e.g., which can be considered the highest priority content characteristics. In some implementations, diversity of types of characteristics is prioritized for the selection. For example, the selected characteristics can be designated to include particular types of characteristics as described above, such as one characteristic from each of multiple types. For example, a highest-ranking content feature characteristic, a highest-ranking location of creation characteristic, and a highest-ranking time of creation characteristic can be selected.

In block 310, the characteristics selected in block 308 are converted into search topics to be displayed. The search topic can be displayed in topic elements in a graphical user interface, e.g., in block 214 of FIG. 2 as described above. For example, search topics can be text labels generated based on detected content feature characteristics (if not previously generated), time of creation labels, etc.

In some implementations, search topics can be images, or portions of images, that are content feature characteristics selected to determine search topics, e.g., in block 308. For example, the search topic can be a representative image (which can be a portion of an image content data item) that represents a type of content feature determined as the search topic, where the representative image is one image (or image portion) in the collection of content data items that depicts the search topic. For example, the search topic can be a representative face of a person identity determined to be a search topic, or a representative image depicting a monument that is determined to be a search topic. To determine the representative image from multiple images depicting the content feature of the search topic, image characteristics can be scored for eligible image content data items (or portions thereof) depicting the selected content feature. For example, the image characteristics can be visual characteristics (e.g., blurriness, brightness, exposure, color noise, etc.), time of capture (e.g., recent captures scoring higher), frequency of occurrence in the set of eligible items (e.g., the higher the frequency, the higher the score), user history (e.g., number of times viewed by the user), etc. In some implementations, the scoring can be based on a predetermined reference scale for image characteristics (e.g., indicating which characteristic values score highest) and/or a trained machine learning model. An image content feature can be selected based on the scores (e.g., the highest total score), and the image portion depicting the selected image content feature (and/or the entire image in which it is included) is provided as the topic image to be displayed as a search topic in a search topic element.

In various implementations, a search topic can be an image or portion of an image from the eligible content items instead of text, or a search topic can include an image in addition to a determined text term. In some implementations, a topic image is included in a search topic in addition to a determined text term if the topic image is determined to have an associated inclusion score above a particular threshold, where the inclusion score is determined based on characteristics such as frequency of occurrence of that type of content feature in the set of eligible content items, user history related to that type of content feature (e.g., number of past views or displays of this particular type of content data item), and/or other characteristics. In some implementations, search topics can similarly include animations (e.g., a cinemagraph or animated GIF), videos that are played within a search topic element, icons (e.g., a stored icon used in a graphical user interface that is associated with a content data item in the eligible content data items), etc.

If it is determined that search topics are not to be identified in block 304, the method continues to block 312, in which the identifying and/or displaying of search topics as described with respect to blocks 212 and 214 of FIG. 2 are omitted. In some implementations of block 312, it may be determined in block 304 that search topics are not to be displayed, and the search topics are still identified as described above with reference to blocks 306-310. These identified search topics are not displayed, e.g., block 214 of FIG. 2 is not performed. If conditions change such that search topics are determined to be displayed in a later iteration of block 304, then the previously-identified search topics can be displayed in the user interface if appropriate (e.g., if still within the threshold distance), e.g., by block 214 of FIG. 2.

Figure 4:
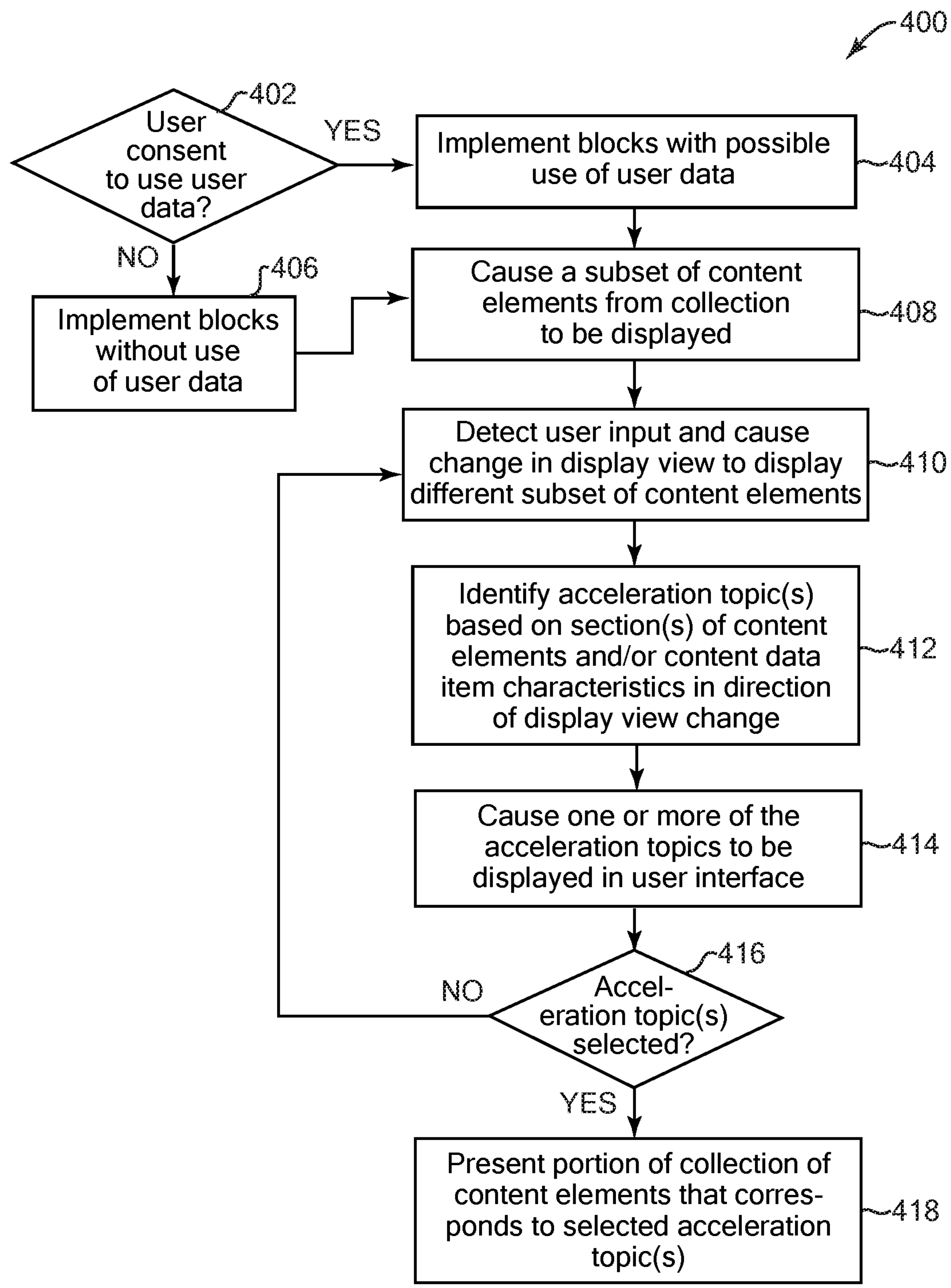
FIG. 4 is a flow diagram illustrating an example method to provide suggested interface selections to accelerate display of content data, according to some implementations.

FIG. 4 is a flow diagram illustrating an example method 400 to provide suggested interface selections to accelerate display of content data, according to some implementations. In some implementations, method 400 can be implemented, for example, on a server system, e.g., messaging server 101, as shown in FIG. 1. In some implementations, some or all of the method 400 can be implemented on a system such as one or more client devices 120-126 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 400.

Some implementations can initiate method 400 based on user input. A user may, for example, have selected the initiation of the method 400 from a displayed user interface. In some implementations, method 400 or portions thereof can be performed with guidance by the user via user input. In some implementations, the method 400, or portions of the method, can be initiated automatically by a user device, in similar ways and implementations as described above for method 200 of FIG. 2. For example, a collection of content data items, e.g., a user's collection of content data items, can be captured, accessed from storage, received from other devices, etc.

In block 402, it is checked whether user consent (e.g., user permission) has been obtained to use user data in the implementation of method 400. For example, user data can include user preferences, user biometric information, images or other content data items in a content collection (e.g., images captured, uploaded, generated, received, accessed, or otherwise associated with a user), messages sent or received by a user, information about a user's social network and/or contacts, user characteristics (identity, name, age, gender, profession, etc.), social and other types of actions and activities, content, ratings, and opinions created or submitted by a user, a user's geographical location, historical user data, etc. One or more blocks of the methods described herein may use such user data in some implementations.

If user consent has been obtained from the relevant users for which user data may be used in the method 400, then in block 404, it is determined that the blocks of the methods herein can be implemented with possible use of user data as described for those blocks, and the method continues to block 408. If user consent has not been obtained, it is determined in block 406 that blocks are to be implemented without use of user data, and the method continues to block 408. In some implementations, if user consent has not been obtained, the remainder of method 400 is not performed, and/or particular blocks using the user data are not performed. In some implementations, if user consent has not been obtained, blocks of method 400 are to be implemented without use of user data and with generic or publicly-accessible and publicly-usable data.

In block 408, a subset of content elements of a set of content elements are caused to be displayed in a display view on a user device. As for FIG. 2, each content element can be a displayed representation of corresponding content data. The subset of the set of content elements is rendered in the display view of the device. For example, the display view can be similar to the display view described above with reference to FIG. 2. In some implementations, the display view is provided on a display screen of a mobile device, e.g., a mobile phone, tablet, goggles or glasses, etc. For example, the mobile device can be any of client devices 122, 124, 126, or 128. In additional examples, the display view can be an area of a display screen of a non-portable device similarly as described above.

The set of content elements corresponds to content data, e.g., a collection of content data items. The content elements and content data items can be similar as described above with reference to FIG. 2. The collection of content elements, or a portion of the set, can be arranged in a particular sequence, e.g., for display. For example, the content elements in the set can be organized based on one or more characteristics of their corresponding content data items, similarly as described for FIG. 2.

In some implementations, the set of content elements can include multiple sections that are provided in a particular sequence, each section including one or more of the content elements. In some implementations, the content elements in each section can be organized according to a same or different sequence, e.g., based on the same or different characteristics of the corresponding content data items. For example, the set can be organized into different months provided in a time sequence (e.g., newest to oldest). The content elements of content data items within each month (e.g., having a time of creation within the associated month) can be provided in a different sequence based on, e.g., other characteristics as described above.

The subset of content elements can be displayed in the display view in a particular layout. For example, the subset of content elements can be arranged in a grid of rows and columns. Some examples of the display of the subset of content elements are described below with respect to FIGS. 6-13. In additional examples, the subset of content elements can be displayed in a single column (e.g., in a size such that the content elements have a width that fits the width of the display view), a single content element at a time, a layout in which some content elements are displayed larger than other content elements (e.g., based on characteristics of the corresponding content data items such as time of creation, detected content features, location of creation, etc.), or other type of layout. The method continues to block 410.

In block 410, input is detected and a change in the display view is caused based on the user input, to present a different subset of content elements of the set of content elements in the display view. In some implementations, the input can be received from a user, e.g., as user input provided via an input device similarly as described above. In various implementations, the change in the display view can be a directed change in the subset of content elements displayed in the display view, e.g., in a particular direction of the sequence of the set of content elements (e.g., view direction). For example, the view direction can be forward in the sequence, or back in the sequence.

In some examples, the directed change can be scrolling of one or more content elements, or portions thereof, into and out of the display view. For example, the scrolling can be in a vertical direction of a display screen that displays the display view, e.g., forward or back. In a forward direction example, content elements at the top of the screen are displayed to move up, across the top border of the display view, and out of the display view (no longer displayed on the display screen), and content element(s) next in the sequence of the set of content elements are moved up into the display view from the bottom border of the display view. In other implementations, the forward direction can be the reverse of this movement. In some implementations, the forward direction can move displayed content elements out of the view via a left border of the display view and can move other content elements into the view via the right border of the display view (or the reverse of this movement can be used for the forward direction). A back direction can move content elements in the opposite direction to the forward direction. In some examples, a plurality of content elements of the collection can scroll through the display view while the input indicates to continue the scrolling. The scrolling movement can be animated to be smooth, or can omit positions between starting and ending positions of the content elements.

In another example, the change in the display view can be a page flip of one or more content elements into and out of the display view, e.g., in a forward or back direction of the sequence. The page flip can remove the displayed subset of content elements from the screen and immediately (or over time, e.g., in a fade process) replace this removed subset with a different subset of content elements that are, e.g., the next in the sequence of the set of content elements (for a forward direction) or are the immediate previous subset of content elements in the sequence (for a back direction). For example, the size of the display view can be considered a page of displayed content elements, and the next or previous subset of content elements that visually fits in the display view can be considered the next or previous page of content elements, respectively. The method continues to block 412.

In block 412, one or more acceleration topics are identified based on one or more particular sections of content element(s) and/or one or more content characteristics in the view direction of the change of the display view. In some examples, the content characteristics are of content data item(s) corresponding to content element(s), e.g., in the view direction. In some implementations, block 412 can be performed (e.g., triggered) in response to particular conditions occurring in the user interface. For example, block 412 can be performed in response to the change in the display view of block 410. Some examples are described with reference to FIG. 5.

In some implementations, one or more particular sections of the set of content elements, and/or content data items, are searched to determine acceleration topics for block 412. In some implementations, similarly as described above for FIG. 3, the set of content elements is arranged in multiple sections (and, in some implementations, the collection of content data items can also be arranged in portions corresponding to the sections of the content elements). The different sections of content elements can be determined, e.g., based on time of creation of the content data items corresponding to the content elements, location of creation, type of depicted content features, the user that created the corresponding content data items, and/or other criteria. The subset of content elements displayed in the display view is in a particular section of the set of content elements, and may be in multiple different sections if the subset spans multiple such sections.

One or more of the sections of the set of content elements may have section labels, e.g., headings or titles that are descriptive of at least some of the content elements in the section (and the corresponding content data items). In some implementations, such labels can be used as acceleration topics. A section label can indicate a characteristic of the associated section of content elements. For example, section labels can be based on one or more characteristics of one or more content data items corresponding to one or more content elements in the sections (e.g., such corresponding content data items can be referred to herein as content data items "in the sections"). For example, a section label can indicate or include the time (e.g., month, day, year, etc.) in which the content data items in the associated section were created (e.g., "May 2017"). In some examples, for a chronological sequence of content elements, each section can be designated as having content data items created on a particular day that is associated with that section.

In further examples, a section label can be or include a location at which one or more (or all) of the content data items in the associated section were created. A section label can be a description (e.g., label or tag) of a content feature depicted in one or more content data items in the associated section, e.g., the name of a person detected to be appearing in content data items in the section, a descriptor word for an object or activity detected to be appearing in content data items in the section, etc. In some implementations, a section label can be a characteristic of a particular content data item in the associated section (e.g., a user-designated or selected representative content data item, or the content data item corresponding to the first or last content element in the content element sequence). In another example, a section label can be the most common (most frequently-appearing) characteristic in the content data items of the associated section. For example, if the most content data items in the section depict a boat while a fewer number of content data items depict other objects, then a descriptive term of the content feature "boats" can be provided in the section title. In some implementations, some terms can be excluded from section titles, e.g., words designated to be generic, such as "people," "faces," etc.

In some implementations, the one or more identified acceleration topics include a next acceleration topic that corresponds to a next section of content elements in the sequence with respect to the display view. For example, the next section of content elements is positioned subsequent to the current section in which the display view is currently positioned, e.g., in the view direction (forward direction), where the next section of content elements is currently not displayed in the display view. In one example, the acceleration topic can include the section label of the next section. In some implementations, identified acceleration topics can include section labels of other sections, e.g., a previous section with respect to the view direction.

In some implementations, the current section (and current content elements displayed in the display view) is based on the content elements displayed after the change in the display view of block 410. In other implementations, the current section can be referenced from a different displayed subset of content elements, e.g., a previous subset of content elements displayed in the display view, such as the subset of content elements in the display view in block 408 prior to the change of the display view in block 410.

In some implementations, one or more acceleration topics can correspond to one or more sections that are positioned within a threshold number of sections of the display view. For example, an acceleration topic can correspond to a section label of a section that is a particular amount of sections away from the display view, a particular amount of content elements away from the display view, a particular amount of rows of content elements away from the display view (e.g., rows in a grid pattern in which the content elements are displayed), etc. In some implementations, the particular number can be set or changed by the user and stored in user preferences or settings. For example, if a user prefers long-range acceleration topics, a stored user preference can indicate to search for acceleration topics in the range of 3-5 sections ahead of the current section of the display view.

Acceleration topics can also or alternatively be identified as characteristics of content data items, e.g., regardless of the sections in which those content data items are included. For example, the content data items corresponding to content elements of the set that are in the view direction of the change in the display view can be searched for characteristics that can be converted into accelerator topics. In some implementations, a portion of the collection of content data items is searched for acceleration topics. For example, content data items that correspond to content elements within a threshold distance of the subset of content data items shown in display view can be searched, and/or within a threshold number of screens, a threshold number of pages, or a threshold number of content data items can be searched, and/or in particular or all directions, similarly as described above for block 212 of FIG. 2 and block 306 of FIG. 3. In some implementations, all the content data items in the collection of content data items are searched to determine acceleration topics, or particular portions of the collection are searched, e.g., based on user preferences, time of creation of content data items (e.g., content data items captured or otherwise created within a particular time period of the present time), location of capture or creation of the content data items, etc.

In some implementations, multiple acceleration topics can be identified, where each acceleration topic is associated with a respective section of the content elements. For example, each acceleration topic can be associated with a different section of the content elements. In some examples, the different sections can be sequential sections in the sequence of the set of content elements. The acceleration topic can be associated with the section by including a section header of the section, and/or by being based on one or more characteristics of content data items in the section.

The content data item characteristics used to determine the acceleration topics in block 412 can be any of a variety of different characteristics. For example, the characteristics can include content features depicted in the searched content data items or otherwise represented in the searched content data items, the time of creation of content data items, locations associated with content data items, activities depicted by the content data items, or other characteristics, similarly as described above for FIGS. 2 and 3 with respect to search topics.

Some examples of identifying acceleration topics are described below with reference to FIG. 5. The method continues to block 414.

In block 414, one or more of the acceleration topics identified in block 412 are caused to be displayed by the user device. For example, acceleration topics can be displayed in the user interface that includes the display view presenting a subset of content elements. In some implementations, the displayed acceleration topics can be visually associated with (e.g., displayed in) interface elements ("topic elements" or "acceleration topic elements") that are displayed in the user interface. For example, the topic elements can be graphical buttons or boxes in which text is displayed, where the text provides the acceleration topics. Some examples of topic elements that correspond to acceleration topics are described below with reference to FIGS. 10-13. If no acceleration topics were identified in block 412 (e.g., described for FIG. 5), then block 414 is omitted. The method continues to block 416.

In block 416, it is checked whether at least one acceleration topic is selected from the one or more acceleration topics displayed in block 414. For example, user input provided to the user interface can select a displayed topic element that corresponds to an acceleration topic. In some examples, the user can select a topic element displayed on a touchscreen of the user device, or select the topic element using a different input device. If no acceleration topic is selected as determined in block 416, the method continues to block 410 to receive input causing change in the display view to display a different subset of content elements (if applicable) and to identify acceleration topics if such a change has occurred (if no such change has occurred, any previously-identified acceleration topics can continue to be displayed in block 414).

If an acceleration topic is selected as determined in block 416, the method continues to block 418, in which one or more resulting content elements in a portion of the set of content elements that corresponds to the acceleration topic (s) selected in block 416 are presented in the display view of the user interface. In some implementations the portion of the set of content elements is a section of the set that includes or is otherwise associated with the selected acceleration topic. For example, the corresponding section can have a heading that corresponds to the selected acceleration topic, e.g., a time, location, or description of a content feature. In some examples, if the acceleration topic corresponds to the heading of the section, then the portion of the set of content elements that is displayed in the display view can include resulting content elements starting from the beginning of the section and filling the display view in the sequence of the content elements in the section.

In some implementations, the resulting content elements of the section can be displayed in other sequences or patterns in the display view. For example, the resulting content elements can be displayed in the display view in a sequence based on characteristics of the corresponding content data items (e.g., content elements associated with a particular type of content feature such as faces, followed by content elements associated with another type of content feature such as landscape features, etc.). In some additional examples, the resulting content elements can be displayed in the display view in a sequence based on a stored indication of the frequency of use, access, or sharing history of the corresponding content data items by the user (e.g., the number of times these content data items have been viewed, shared, rated, or otherwise used by the user or by multiple users), if user consent has been obtained to access data indicating such historical use by the user.

In some implementations, content elements of the set of content elements automatically transition within the display view to the section of resulting content elements corresponding to the particular topic. For example, a visual transition can be displayed within the display view from previous content elements displayed in the display view to the resulting content elements. In some examples, a transition animation can change the display view from displaying previous content elements at its former position within the sequence of the set of content elements (e.g., content elements shown immediately prior to the presentation of content elements in block 418) to a different position in the sequence to display the resulting content elements in response to the accelerator topic being selected. For example, content elements of the set can automatically move in the collection sequence through the display view, e.g., visually scroll, page flip, or otherwise change, until the section of content elements corresponding to the selected acceleration topic is reached. In additional examples, the change can be a scrolling animation (e.g., at a rate higher than a typical scrolling rate manually instructed by a user), a gradual fade-out of the display of previous content elements and simultaneous or sequential fade-in of the resulting content elements, an immediate replacement of all of the previous content elements with all of the resulting content elements (e.g., a jump directly to the new portion of the set of content elements), a replacement of a subset of the previous content elements with a corresponding subset of the resulting content elements in the display view, etc.

In some implementations, the resulting content elements can be displayed in a new or separate view or window in the user interface or in a different user interface provided on the user device. In some implementations, the resulting content elements can be displayed in response to receiving user input, such as a command, that requests the resulting content elements be displayed.

Figure 5:
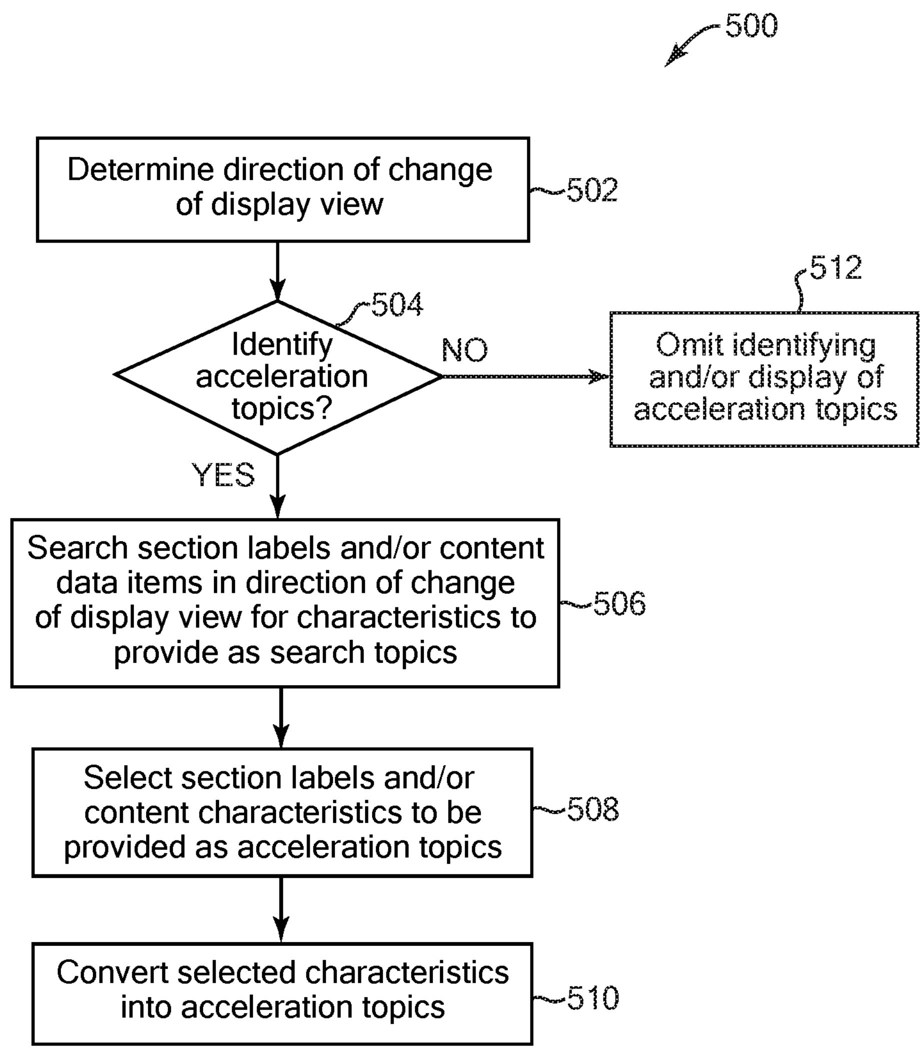
FIG. 5 is a flow diagram illustrating an example method to identify acceleration topics, according to some implementations.

FIG. 5 is a flow diagram illustrating one example method 500 to identify acceleration topics, according to some implementations. For example, method 500 may be used to implement block 412 of the example method 400 of FIG. 4. In some implementations, method 500 can be performed in association with a user interface that displays a subset of content elements in a display view as described for FIG. 4. User consent is obtained for the blocks, similarly as described for FIG. 4.

In block 502, a direction of change of the display view (view direction) may be determined with respect to the sequence of the set of content elements. For example, in some implementations as described above, the direction of change can be forward or back in the sequence. In some examples, the change in of the display view is scrolling or a page flip to display the different subset of content elements, e.g., in response to received user input.

In block 504, it is determined whether to identify acceleration topics in the sections of content elements and/or collection of content data items. In some implementations, the identifying can be performed (e.g., triggered) in response to particular conditions occurring in the user interface. In some implementations, the identifying can be performed when method 400 of FIG. 4 is initiated, and/or in response to other conditions and/or user input. For example, the identifying can be performed in response to the change in the display view of block 410 of FIG. 4. Such a change can, for example, be instructed by user input provided by a user.

In some implementations, the identifying is performed in response to the directed change in the display view meeting a threshold rate of change. For example, the change in the display view can be scrolling and it is checked whether the scrolling meets a threshold rate of scrolling (e.g., scrolling speed). In some implementations, the change in display view can be page flipping to a different subset of content elements, and the rate of page flipping can be determined if it meets a threshold rate of page flipping (e.g., a threshold number of pages of content elements being sequentially displayed in the display view within a particular timespan).

In additional examples, the identifying of acceleration topics can be performed in response to other conditions. The conditions can include a particular period of time passing after the display view is first presented by the user device, and/or periodically after every such period of time passes. In additional examples, the identifying of acceleration topics can be performed in response to a message from another user being received at the user device over the network while the display view is presented (e.g., the message identifying or including a topic that is used as a acceleration topic), in response to an event occurring as based on the user's stored calendar or to-do list, in response to a selection of a content element (e.g. by user input), and/or in response to returning to a display of the subset of content elements after a display of a single content element (e.g., based on user input).

If it is determined to identify one or more acceleration topics in block 504, the method continues to block 506, in which section labels and/or content data items in the view direction of the change of the display view are searched for characteristics to provide as acceleration topics. In some implementations, section labels within a threshold distance, and/or content data items that correspond to content elements within a threshold distance, of the display view are searched for characteristics to provide as acceleration topics in the view direction. In the example method of FIG. 5, the section labels that are searched are within the threshold distance of the subset of content elements in the display view, and/or the content elements corresponding to the content data items that are searched are within the threshold distance of the subset of content elements in the display view.

In some implementations, the threshold distance can be a particular number of sections of the set of content elements, e.g., one section (the next or previous section). In some implementations, the threshold distance can be a particular number of pages or screens of content elements in the forward or back direction in the sequence of the content elements in the set. For example, each page or screen can be the amount of content elements displayable simultaneously in the display view, based on the current display size of the view and the current display size of the content elements (and where these sizes are modifiable, e.g., based on user input). In some implementations, the threshold distance can be a threshold number of content elements in the forward and/or back directions in the sequence of the collection.

The threshold distance can be referenced from (e.g., relative to) the display view. For example, the threshold distance can be referenced from the current section of the collection in which the display view is positioned, referenced from last content element displayed in the display view in the forward direction, and/or referenced from the first content element in the display view in the back direction. In some implementations, the section labels and/or eligible content elements that are searched for acceleration topics are sections and content elements that are not currently being displayed, e.g., sections and content elements outside the current display view after the change in the display view of block 410. In some implementations, the threshold distance can be referenced from a previous subset of content elements in the display view, e.g., the subset of content elements in the display view in block 408 prior to any change of the display view in block 410.

In some implementations, the threshold distance can be in a particular direction (search direction) in the sequence of the set of content elements, e.g., forward or back. In such implementations, content data items corresponding to content elements in the search direction are searched for acceleration topics. The search direction can be based on the view direction of the change in the display view that was determined in block 502. For example, the search direction can be the same as the view direction, such that acceleration topics are searched for in a portion of the collection of content data items that corresponds to a portion of content elements toward which user input is moving the display view. In some implementations, the search direction can be the opposite direction to the view direction, e.g., a back direction. In some implementations, the search direction can be multiple directions, e.g., forward and back with respect to the display view.

Section labels that can be used to provide the acceleration topics can be based on one or more characteristics of the content data items in the associated sections, similarly as described above for FIG. 4. Characteristics of content data items can also or alternatively be used to provide the acceleration topics, and can be any of a variety of different characteristics, similarly as described above for FIG. 4. In some examples, the characteristics can include identifications of content features or content feature types, the time of creation of content data items, locations associated with content data items, activities depicted by the content data items, particular device or type of device used to capture or create the content data item, and other types characteristics.

In some implementations, an individual rank (e.g., priority) is assigned to each of multiple section labels and/or content data item characteristics found within the threshold distance of the displayed subset of content elements. The rank can be based on a variety of criteria. For example, if acceleration topics can be obtained from directions forward and back, then characteristics in the forward direction can be assigned a higher ranking than characteristics from the back direction. In additional examples, the criteria can include the number of content data items that include the characteristic in the searched content data items (e.g., within the threshold distance). For example, characteristics that were identified in the largest number of content data items can be given the highest ranks.

In additional examples, the criteria can include specific types of characteristics that provide a higher rank than other types of characteristics. For example, time of creation characteristics may be assigned a higher rank than content feature characteristics (such as descriptions or tags of objects detected in images), and content feature characteristics may be assigned a higher rank than location characteristics. In additional examples, the criteria can include higher ranks assigned to particular sub-types of characteristics within a type of characteristic. For example, particular types of detected content features (e.g., faces depicted in images) can be assigned a higher rank than other types of detected content features (e.g., landscape features depicted in images). In some implementations, section labels can be assigned a higher (or lower) rank than characteristics of content data items. Other criteria can be used, e.g., ranking criteria described above for search topics of FIG. 2 (e.g., frequency of user activity, confidence level of detection or recognition, named or communicated users, etc.).

In some implementations, a total rank can be determined for each section label and/or characteristic found, where the total rank is a combination (e.g., sum) of rank modifiers that are determined based on multiple of the criteria.

In some implementations, the section(s) in which the subset of content elements is currently situated is prioritized for the search of acceleration topics in block 506, or can be the only section of content elements that is searched for acceleration topics. In some implementations, the next section (or previous section) of content elements in the sequence of the collection can be prioritized for acceleration topics, or a particular number of sections forward and/or back in the sequence.

In block 508, section labels and/or content characteristics that will be used as suggested acceleration topics in the user interface are selected from the identified characteristics. For example, the selected section labels and/or content characteristics can be used for the acceleration topics identified for display in block 412 of FIG. 4. The selected section labels and/or content characteristics may be selected from a group of section labels and/or content characteristics that were identified from the content elements and content data items, e.g., in block 506. For example, a top number of highest-ranking section labels and/or content characteristics can be selected, e.g., which can be considered the highest priority content characteristics. In some implementations, diversity of types of characteristics is prioritized for the selection. For example, the selected section labels and/or characteristics can be designated to include particular types of characteristics, e.g., a highest-ranking content feature characteristic, a highest-ranking location of creation characteristic, and a highest-ranking time of creation characteristic. The method continues to block 510.

In block 510, the characteristics selected in block 508 are converted into acceleration topics. For example, acceleration topics can be text labels that are section labels, generated based on detected content feature characteristics, time of creation labels, etc. In some implementations, acceleration topics can be or include representative images, videos, animated images, icons, or other type of data included in or associated with content data items in the sections pointed to by the acceleration topics, similarly as described above for search topics with respect to FIG. 3. Such acceleration topics can be displayed in topic elements in a graphical user interface, e.g., in block 414 of FIG. 4 as described above.

If it is determined that acceleration topics are not to be identified in block 504, the method continues to block 512, in which the identifying and/or displaying of acceleration topics as described with respect to blocks 412 and 414 of FIG. 4 are omitted. In some implementations of block 512, it may be determined in block 504 that acceleration topics are not to be displayed, and the acceleration topics are identified as described above with reference to blocks 506-510. These identified acceleration topics are not displayed, e.g., block 414 of FIG. 4 is not performed. If conditions change such that acceleration topics are determined to be displayed in a later iteration of block 504, then the previously-identified acceleration topics can be displayed in the user interface if appropriate (e.g., if still over or within threshold distances), e.g., by block 414 of FIG. 4.

Various other features can be included in some implementations of the methods described above. For example, determined search topics can be based on a prior search topic that was displayed in the graphical user interface as described herein and has been selected, e.g., by the user in the graphical user interface. For example, if a displayed first search topic is selected in the user interface, instead of or in addition to displaying the content data items satisfying the first search topic as described above, one or more additional search topics can be displayed based on one or more content characteristics of the searched content data items. In some examples, the additional search topics may have a narrower scope within a broader scope of the previous search topic. For example, if a search topic of "San Francisco" is determined as described above based on eligible content data items within a threshold distance of a prior display view, and this search topic is selected by a user, then additional, narrower search topics can be displayed in response. In one example, additional search topics such as "Golden Gate Park," "Golden Gate Bridge," and "Pier 39" are displayed, which are derived from particular content data items that satisfy the selected prior search topic and have more granular locations of creation located within the larger-scope location of the prior search topic, where these particular content items are within the threshold content element distance of a current subset of content elements displayed in a current display view. In some implementations, such search topics can be displayed as additional search topic elements in the user interface. Further additional search topics can be determined similarly after selections of additional search topics, where an additional search topic can be narrowed further based on the previous search topic(s) selected. In some implementations, such additional search topics can be displayed based on a different form of user input that the selection of a topic element, e.g., a different gesture or other command.

Figure 9:
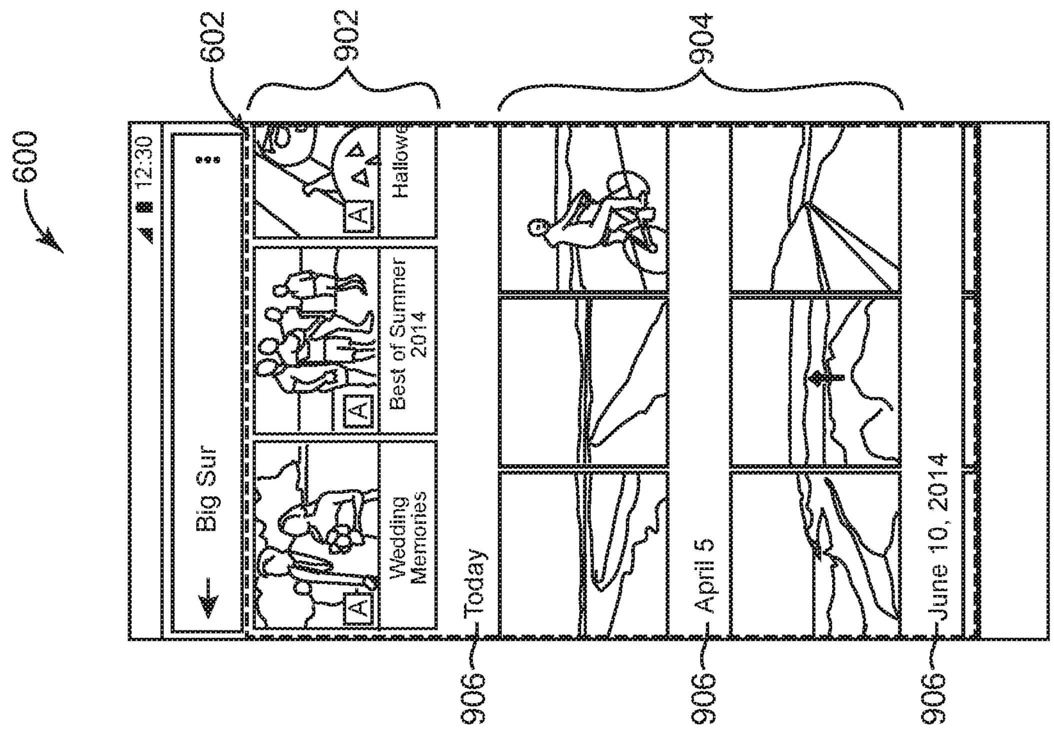

Similar additional, e.g., more narrow, search topics can also or alternatively be determined based on resulting content data items that satisfy a search performed by selecting a previous search topic (e.g., as shown in FIG. 9). In some examples, such additional search topics can be displayed in the same user interface as resulting content elements. For example, selecting an additional search topic that is displayed with resulting content data items can cause an additional search of the resulting content data items, and results to that additional search can be displayed, e.g., in the same or different user interface. In some implementations, the entire collection of content data items can be searched based on a selected additional search topic. Further searches can be performed similarly by continuing to receive user selections of additional search topics. In some examples, each additional search may generate new additional search topics based on previously-selected search topics, and thus the new additional search topics may be narrower in scope than previously-generated search topics.

In some implementations, the eligible content data items which are used to determine the search topics and/or acceleration topics can be determined based on other criteria instead of or in addition to the threshold distance of content elements as described above. For example, previous user selections of one or more content data items (via selected content elements) in the user interface can be used to influence the determination of topics. In some examples, selections of content elements in the user interface can be received, and then the display view is scrolled, page-flipped, etc. to cause search topics and/or acceleration topics to be displayed as described herein. The eligible content data items for determining search topics and/or acceleration topics can be within a threshold distance of the display view as described herein, and these eligible content items can also be filtered and/or ranked based on the previous user selections of content data items in the user interface. For instance, if the user has previously selected content data items that depict a content feature such as a particular person or object, then the search/acceleration topic can be determined based on content data items within the threshold distance and that depict that content feature (e.g., particular person or object). In an acceleration topic example, section headings that include content data items depicting the previously-selected content feature can be displayed as acceleration topics.

In some implementations, such previously-selected content data items can be used to narrow the breadth or scope of the displayed search topics and/or acceleration topics to more specific or granular topics or subjects compared to topics determined when no such selections were made. For example, this can be similar to implementations described above in which a user selects a search topic and narrower search topics are displayed in response. In some examples, a user has previously selected content data items in the user interface that depict content features, e.g., particular person "Ann" and the Golden Gate Bridge. A search topic or acceleration is determined, e.g., within a threshold distance, when the user scrolls the display view. A search topic is determined as described herein to be "San Francisco" based on location of capture of eligible content data items, and this topic is narrowed to two topics based on the content features of the previously-selected content data items, e.g., to be "Golden Gate Bridge" and "Ann in San Francisco" (or alternatively, "San Francisco" displayed next to an image of Ann in a topic element). In some implementations, the number of selections of a particular content feature can influence the search topic displayed. For example, selections of a content feature in content data items can narrow a search topic if the number of selections satisfies a threshold number. In another example, a content feature selected a greater number of times is given higher rank or priority to be displayed as a search topic than a different content feature selected a fewer number of times.

In some implementations, a preview of the resulting content elements (e.g., from blocks 220 or 418) can be displayed in response to the selection of the search topic or acceleration topic, e.g., based on a particular form of user input. For example, a window can be displayed in the graphical user interface, and the preview includes a subset of the resulting content elements displayed in the window prior to replacing the existing display view with the resulting content data items.

In some implementations, the particular search topics and/or acceleration topics that are determined for display in topic elements can be based on the speed or rate of the change of the display view (as in blocks 210 or 410), e.g., the rate of scrolling, page flipping, etc. In some examples, the threshold distance can be based on the rate of change, e.g., the rate of scrolling or page flipping. In some examples, if the rate of display view scrolling is below a threshold rate, then the eligible content data items in which to search for topics can be within a first threshold distance. If the rate of display view scrolling is above the threshold rate, then the eligible content data items (or higher priority/ranked content data items) can be within a second threshold distance greater than the first threshold distance, and in some implementations, can be a minimum distance from the display view, e.g., a distance greater than the first threshold distance (or other distance, e.g., a distance that is smaller than the second threshold distance). For example, such features can allow closer content data items to be skipped in the search of topics at higher scrolling rates. Such features can allow display of search topics and acceleration topics which are more appropriate and relevant to the user's mode of viewing—e.g., based on later-positioned content data items in accordance with a faster scrolling rate of the display view.

In some implementations, the breadth or scope of search topics and/or acceleration topics in displayed topic elements can be based on the speed or rate of the change of the display view. In some examples, if the rate of display view scrolling is above a threshold rate, then more broad topics (of larger scope) are determined based on the eligible content data items, such as broad categories of content features (e.g., "dog", "car", "San Francisco," etc.), or broad times (e.g., May 2017). If the rate of display view scrolling is below the threshold rate, then more narrow topics (of smaller scope) are determined based on the eligible content data items, such as narrower categories of content features (e.g., "terrier," "Honda," "Golden Gate Bridge," etc.) or narrower times (e.g., May 16, 2017).

In some implementations, one or more content elements can correspond to portions of content data items or can be indicators or pointers to a position within a content data item. For example, a displayed content element can correspond to a chapter or paragraph of a book or video, a track of a music album, or other portion within a content data item that is a book, a video, an audio segment, a document, or other content data. Topic elements can display search topics or acceleration topics for these portions of content data items, e.g., chapter titles or numbers, track titles or numbers, topics in a document, etc.

In various implementations, topic elements can display text, icons images, cinemagraphs, videos, or any combination of these types of topics. For example, a topic element providing a search topic for a particular person can display a representative image or thumbnail of that person, e.g., obtained from the collection of content data items or other available source. A topic element providing a title of an album can list the text title as well as an icon indicating its status as an album. In some implementations, an icon can be displayed in a topic element that indicates an audio segment, where a particular form of user input (e.g., holding a touch on the element, hovering a pointer over the element, etc.) can cause the audio segment to play from speakers of the user device. In some implementations, an audio topic element can display a name (or image) of a person who has been detected to speak in one or more audio content data items. Audio topic elements can display text descriptions or images of the sources of other sound effects (e.g., rain for a rain sound, train for a train sound, etc.).

In some implementations, the current context of the user device can be used in the determination of search topics and/or acceleration topics for displayed topic elements. For example, the current time and/or geographic location of the user device can be provided as search topics or acceleration topics. In another example, if the system determines that the current day is the user's birthday, then a search topic and/or acceleration topic of "birthday" can be provided.

In some implementations, the set of eligible content data items that are searched for search topics and/or acceleration topics can be determined based on the current context of the user device. For example, if it is determined that the current day is the user's birthday, then content data items that are related to birthdays (e.g., content data items depicting birthday objects such as cake, candles, party decorations, etc.) can be prioritized for providing search topics and acceleration topics, e.g., content data items having those characteristics are assigned a higher rank. In another example, the current device location can be prioritized when searching for locations in the eligible content data items.

In some implementations, multiple users can share the collection of content data items such that these users can each access the shared collection of content data items (e.g., one or more shared albums of images). Topic elements for search topics and/or acceleration topics as described herein can be displayed in graphical user interfaces of user devices of each of the sharing users, based on the shared content data items.

In various implementations, the graphical user interface used as described herein can be associated with a particular application program or other program. In some examples, the collection of content data items used in implementations herein can be a particular collection of content data items that is accessible by the application program of the user interface, and which may be different than another collection of content items accessible by a different application program with a user interface. For example, one application program can be a camera application which accesses images captured using that camera application as the collection of content data items, and a different application program can be a photo browser application that accesses a different library of the user's images as the collection of content data items. In some implementations, multiple such different collections of content data items can be combined and used as the collection of content data items for implementations herein. For example, a graphical user interface of one application program can access content data items associated with a different application program, e.g., to allow search topics and acceleration topics to be displayed based on sections and/or content data items in the different collection, thus allowing searches of the different collection based on a selected search topic, and/or moving to the display view to a section of content elements in the different collection based on a selected acceleration topic.

In some implementations, different user commands, e.g., different user input gestures performed with fingertips on a touchscreen or with a pointer displayed in the user interface, can be used to command different functions described herein. Examples of different gestures can include two fingers in a swipe on a touchscreen, tracing out a portion of a circle with a fingertip or pointer, etc. Other forms of user input can include a longer press on a touchscreen, a swipe to pull down a menu of commands, etc. In another example, scrolling in a different direction than the directions of scrolling content elements can be enabled to scroll or otherwise display different topic elements in the user interface. In some examples, if vertical scrolling is provided for displaying the set of content elements, horizontal scrolling can be used to scroll additional topic elements into the display of the user interface, or can be used to command other features, e.g., to command display of different types of characteristics in the topic elements (e.g., related to types of characteristics such as people, landscapes, activities, etc.).

For example, different commands or gestures can indicate different particular types of content characteristics to be provided as search topics and/or acceleration topics in displayed topic elements. In some examples, two fingers in a swipe on a touchscreen can be detected as a command to display search topics and acceleration topics related to a general or broad commanded characteristic such as "people." In some implementations, the commanded characteristic that is indicated by the gesture may have been previously input by the user to stored device settings or user preferences. In some examples, the methods can search eligible content data items for characteristics that are related to the commanded characteristic, e.g., search for characteristics pre-associated with the commanded characteristic or which are determined to be within a type or category of the commanded characteristic. Topic elements having the found characteristics are displayed. For example, particular names of persons found in eligible content data items can be displayed in topic elements in response to a commanded characteristic of "people."

The methods, blocks, and operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

FIGS. 6-13 are diagrammatic illustrations of examples of display screen graphical user interfaces displayable on a device, e.g., a client device or other device used by a user. In these examples, content elements corresponding to portions of a collection of content data items are displayed, where the content elements are thumbnail images derived from content data items that are images. For example, the collection of content data items can include one or more image albums that are associated with the user of the device. In these examples, the thumbnail images are displayed as smaller representations of content data items that are stored images that have a higher resolution of pixels than the thumbnail images. The images can be stored in accessible storage, and the device can downsize the resolution of the images to create the content elements. In other examples, other types of content elements can be displayed in the graphical user interfaces and/or other types of content data items can be included in the collection of content data items. For example, icons, filenames, or other content elements can be displayed to correspond to and represent content data items such as videos, audio segments, documents, files of other data, etc.

Figure 6:
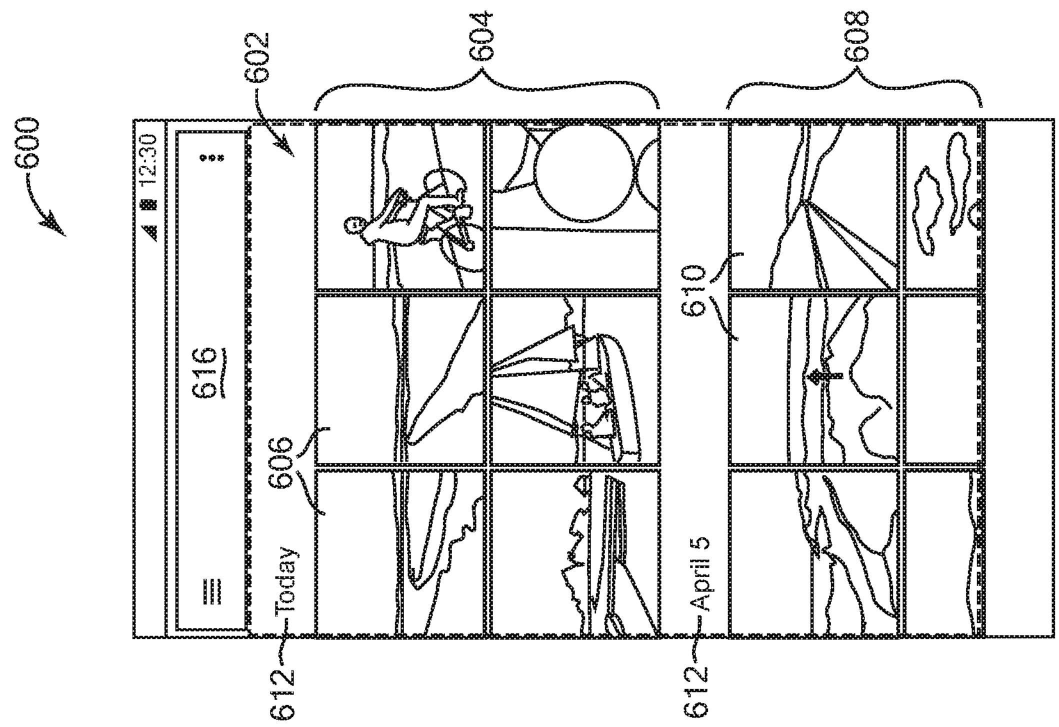

FIGS. 6-9 illustrate example implementations that provide search topics in a user interface to enable searching of content data items. FIG. 6 illustrates a graphical user interface 600 displayed by a user device, e.g., on a display screen of the device. User interface 600 includes a display view 602 which is a portion of the user interface 600 that displays content elements that correspond to stored content data items. In this example, display view 602 (within the dashed line) displays one or more sections of content elements. For example, section 604 includes six content elements 606, and section 608 includes at least content elements 610. In this example, the content elements in each section are displayed in a grid pattern where, e.g., a horizontal row of content elements includes three content elements (maximum) and the number of the rows is based on the number of content elements in the section. In some implementations, other patterns can be displayed, e.g., rows having two content elements, four content elements, etc. The sequence of the collection of content elements is provided in a left-to-right, top-to-bottom sequence of content elements, with each section of content elements following the previous section with a visual separation (and section label) between sections.

Each section 604 and 608 of content data items includes a section label 612 that is displayed as text above the start of the section. In this example, the section label 612 is a text label that indicates a time at which the content data items corresponding to the content elements in the section were created, e.g., the date on which the images represented by the content elements were captured by one or more cameras or other devices. Section labels can include other types of information in other implementations, such as location where one or more of the content data items in the section were created (e.g., captured), a description of one or more characteristics of the content data items in the section such as depicted content features, etc.

A search field 616 is also displayed in user interface 600. Search field 616 can display data derived from user input to the device that forms a search query, such as a text search query based on user input provided via a displayed or physical keyboard. The device can search the collection of content data items for characteristics that match the search query, e.g., search images for features and/or metadata that matches or is similar to a text search query. In some implementations, other types of search queries besides text can be input, such as an image that is a search query, e.g., to search for image features included in the search query image.

Figure 7:
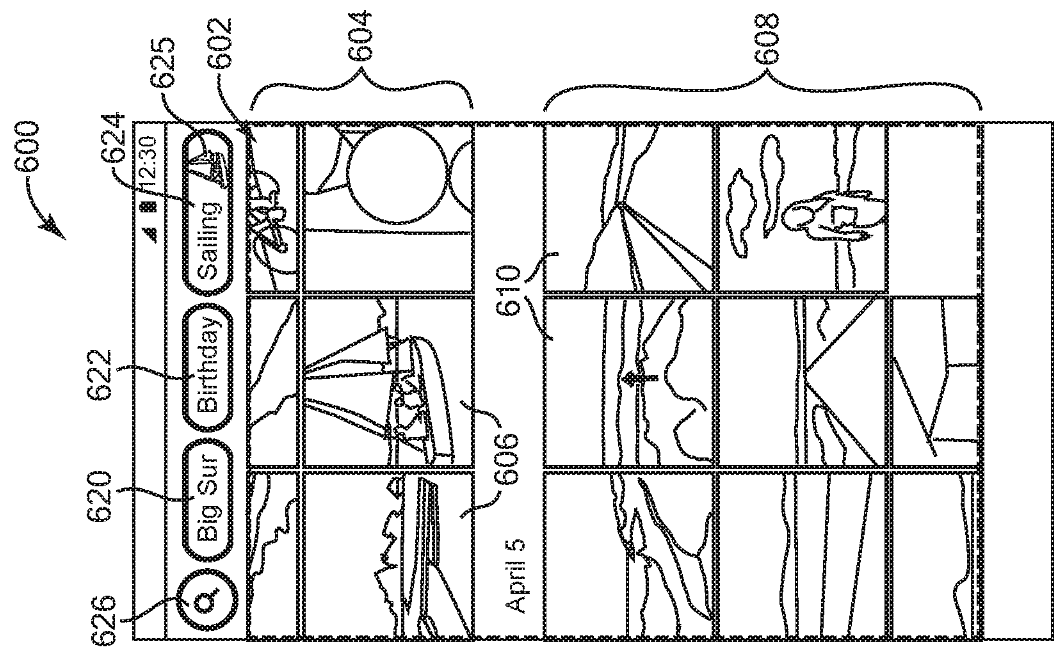
FIGS. 6-9 are graphic representations of example user interfaces that provide search topics to enable searching of content data items, according to some implementations.

FIG. 7 illustrates the graphical user interface 600 of FIG. 6 displayed by a user device, where topic elements according to features described herein are being displayed. The display view 602 has changed such that the sections 604 and 608 have been scrolled upward in the display view 602, e.g., the display view 602 has been scrolled down with respect to the content elements, such that the view direction is forward in the sequence of content elements.

In this example, the scrolling has a scrolling rate that is above a particular threshold rate that indicates search topic elements are to be displayed in the user interface 600. In response to detecting the scrolling of content elements being above the threshold scrolling rate, the device displays topic elements 620, 622, and 624, which are search topic elements. Each of these topic elements includes one or more text terms that are derived from one or more eligible content data items corresponding to eligible content elements. Any of the search topic elements can be selected to cause automatic input of the associated search topic to the user interface 600 as a search query. For example, user input can be provided to the user interface 600 to select one of the search topic elements 620, 622, and 624. In some examples, the user can tap a touchscreen with a finger at a location of the display of the search topic element to select that topic element. In other examples, the user can control a pointing device to move a displayed controlled cursor onto a search topic element to select the topic element.

In some implementations, the search topics in the search topic elements are determined based on one or more characteristics associated with eligible content elements that are within a threshold distance of one or more content elements displayed in the display view 602. For example, the eligible content elements can be positioned in the display view and within a particular number of screens from the display view, where a screen is the vertical distance of the display view. In some examples, the eligible content elements can be positioned within three screens previous to the display view 602 and within three screens after the display view 602 in the sequence of content elements.

In other examples, the eligible content elements can be positioned in a direction of the sequence that is based on (e.g., corresponds to) the scrolling direction (the view direction). For example, the scrolling is in a direction forward in the sequence, to display additional content elements positioned later in the sequence of content elements after the display view, so the search topics in the topic elements can be based on content elements positioned later in the sequence, e.g., within a threshold distance of the display view.

In the example of FIG. 7, search topic element 620 includes the search topic text term "Big Sur" which is a location name. This location was determined based on a number of content data items that are within the threshold distance of the display view 602 and which have location metadata indicating these images were captured at the location Big Sur. For example, Big Sur may be the most common or frequently-appearing location (or most common/frequent characteristic) occurring for content elements within threshold distance, and/or may meet some other criteria or score highly for ranking criteria. For example, criteria can be based on a stored user history of device actions related to content data item locations, if user consent has been obtained to access and use such a history. In some examples, the location of topic element 620 may be a location that has been selected or viewed most commonly by the user out of the locations for content elements within the threshold distance, based on a user history of image selections and viewings. Other criteria can include the most sharing occurrences to other user devices by the user, preferred locations as indicated by stored user preferences, etc.

Search topic element 622 includes the search topic text term "birthday" which has been detected in content data items within the threshold distance. In some examples, the term "birthday" can be based on detecting objects depicting in the content data items which are associated with birthdays, e.g., cake, hats, balloons, etc. In some implementations, the time of creation of the content data items can be correlated with known dates of birthdays, such as obtained from a user calendar, to-do list, etc. accessible to the device, if user consent has been obtained to allow access and use of such data. In this example, birthday-related content features and times of creation were found to be common among the content data items within the threshold distance of the display view 602.

Search topic element 624 includes the term "sailing" which is a descriptive term for an activity detected in the content data items within the threshold distance. For example, this activity can be detected based on content features detected in content data items, such as sailing boats depicted in images. In some implementations, the time of creation of the content data items can be correlated with known dates of events, such as obtained from a user calendar, to-do list, etc. accessible to the device and which describe the activity, if user consent has been obtained to allow access and use of such data.

In this example, search topic element 624 also includes an image 625 that is a portion of an image that was included in the set of eligible content items used to determine the search topic element 624. For example, a sailing boat that is a portion of an image is displayed. In some implementations, this image portion is determined for the search topic element 624 based on it being a content feature that was used to determine the search topic text term "sailing," and/or based on it having the highest scoring image characteristic(s) of the images in the set of eligible content data items as described above. In some implementations, the image 625 is included in search topic element 624 alongside text because it scored above a particular threshold, where the score is based on one or more various characteristics, e.g., number of occurrences of this type of content feature (e.g., an object that is a boat) in the eligible content data items, user history, etc. In some implementations, the image can be displayed instead of text in the search topic element 624.

Other or alternate topic elements and search topics provided in topic elements can be displayed in other examples. For example, search topics can include the names (and/or images) of users or persons known to the user who are depicted in content data items, which can be determined based on detecting content feature characteristics such as faces in content data items such as images and videos, detecting a voice in an audio segment, etc., if user consent has been obtained to allow such access and use of such data.

A search interface element 626 can be displayed in some implementations, which replaces the search field 616 shown in FIG. 6 and is receptive to selection by user input. For example, the search field 616 of FIG. 6 is configured to display characters input by the user to form a user-created search term, and in response to the scrolling being over a threshold scrolling rate, the search field is replaced with a search interface element 626 displayed in the user interface that saves space in the display for the search topic elements. If user input selects the search interface element 626, the search field 616 can be displayed in place of the search interface element 626 and/or in place of one or more of the topic elements 620, 622, and 624.

Figure 8:
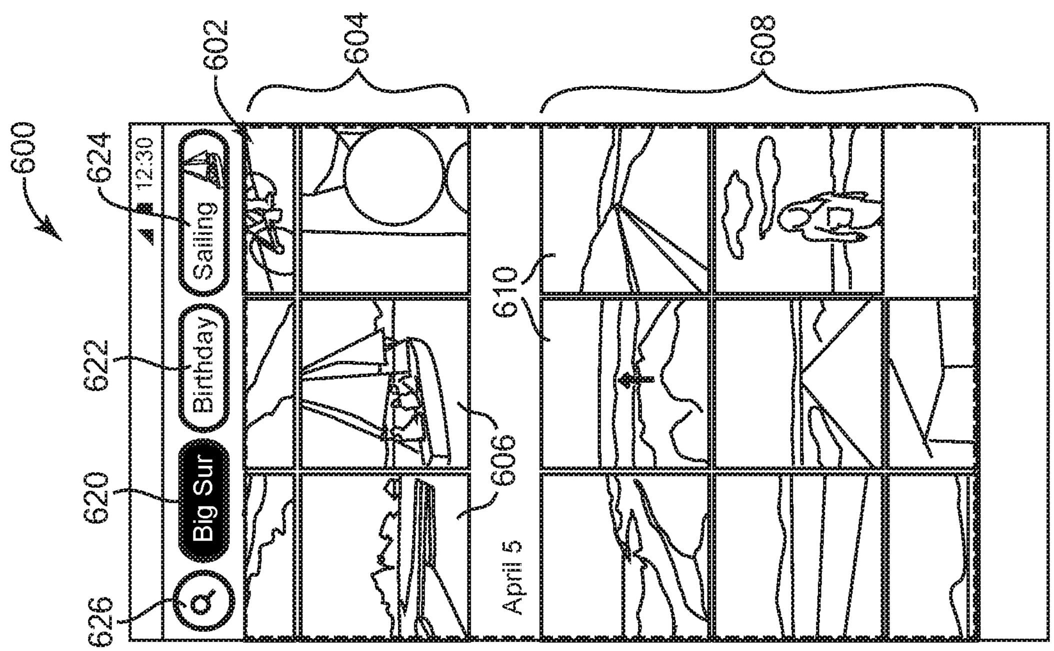

FIG. 8 illustrates the graphical user interface 600 of FIG. 6 displayed by a user device, where a topic element 620 has been selected by user input as indicated by the shown filled-in topic element 620. For example, user input such as touch input on a touchscreen can select the topic element 620, or other form of user input as described herein.

FIG. 9 illustrates the graphical user interface 600 of FIG. 6 displayed by a user device, in response to topic element 620 being selected by user input as indicated in FIG. 8. A search has been performed for content data items that match a search query based on the text of the selected topic element 620. Interface 600 replaces the topic elements 620, 622, 624 and search interface element 626 with the search field 616, where the search field 616 includes the text from the selected topic element 620 to indicate that a search has been performed with that text as a search query.

Display view 602 has been changed to display results of the search performed based on the search topic of topic element 620. For example, content elements are displayed that correspond to content data items that satisfy the search query based on the search topic. In this example, the former content elements displayed in the display view 602 (e.g., in FIGS. 7-8) are removed and replaced by the results shown in FIG. 9.

In this example, three content album elements 902 are displayed at the top part of the display view 602. The content album elements represent content albums, e.g., folders or other predetermined groups or collections of content data items. These content albums include one or more content data items that have one or more characteristics that match (e.g., exactly match or are similar semantically or in form) the selected search topic. For example, content data items can be included in each album that were created at a location matching (or within a threshold distance of) the location indicated by the selected search topic. In this example, the three albums displayed have the most content data items captured at the search topic location. Additional albums that include one or more matching content data items can be available for display based on user input, e.g., a particular command.

Resulting content elements 904 are displayed in the lower part of the display view 602. These content elements correspond to individual content data items that satisfy the search query using the selected search topic, e.g., result from the search. In this example, the resulting content elements 904 are displayed according to their sections which are organized based on time of creation of their corresponding content data items. Section labels 906 indicate the time (day) of creation for the content data items within sections. In this example, the resulting content elements 904 include content elements that were displayed in the display view 602 in FIGS. 7-8, as well as content data items that were not previously displayed in the display view 602 in FIGS. 7-8 and were within a threshold distance of the display view 602 of FIGS. 7-8.

FIGS. 10-13 illustrate example implementations that provide acceleration topics in a user interface to enable accelerated display of content data items.

Figure 10:
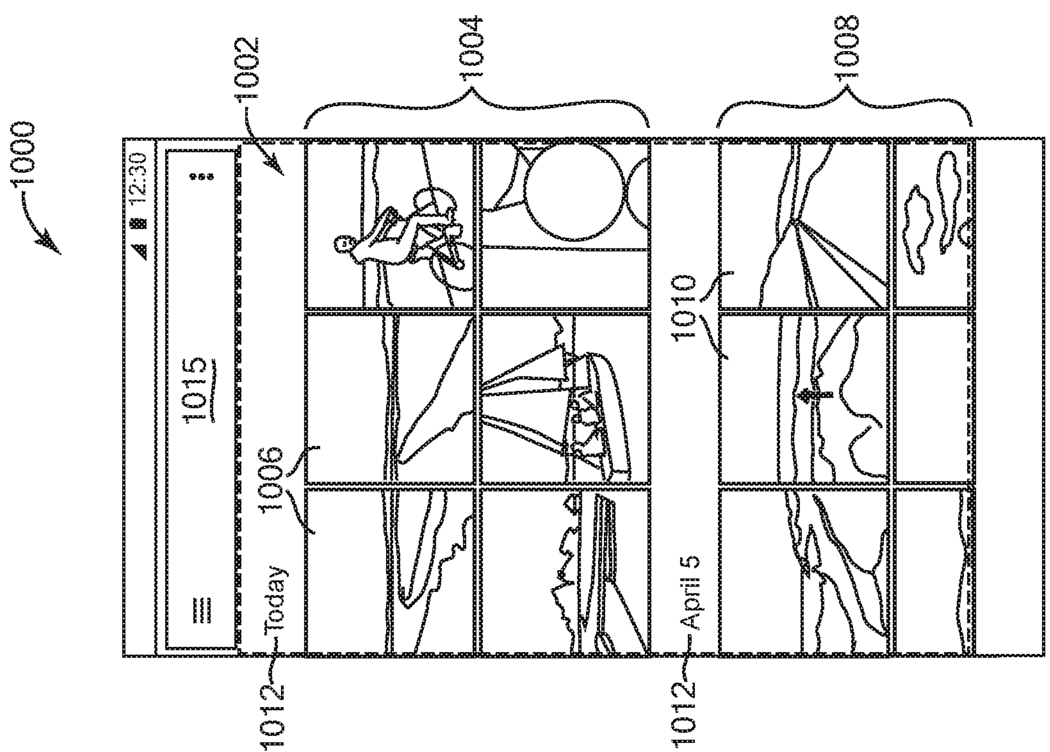

FIG. 10 illustrates a graphical user interface 1000 displayed by a user device, e.g., on a display screen of the device. User interface 1000 includes a display view 1002 which is a portion of the user interface 1000 that displays content elements that correspond to stored content data items. In this example, display view 1002 displays one or more sections of content elements. For example, section 1004 includes six content elements 1006, and section 1008 includes at least content elements 1010. The display of content elements can be similar to the display described above with respect to FIG. 6.

Each section 1004 and 1008 of content data items includes a section label 1012 that is displayed as text above the start of the section. In this example, the section label 1012 is a text label that indicates a time at which the content data items corresponding to the content elements in the section were created, similarly as for FIG. 6. A search field 1015 is also displayed in user interface 1000, which can display a search query input to the device via user input similarly as described for FIG. 6. The device can search the collection of content data items for characteristics that match the search query.

Figure 11:
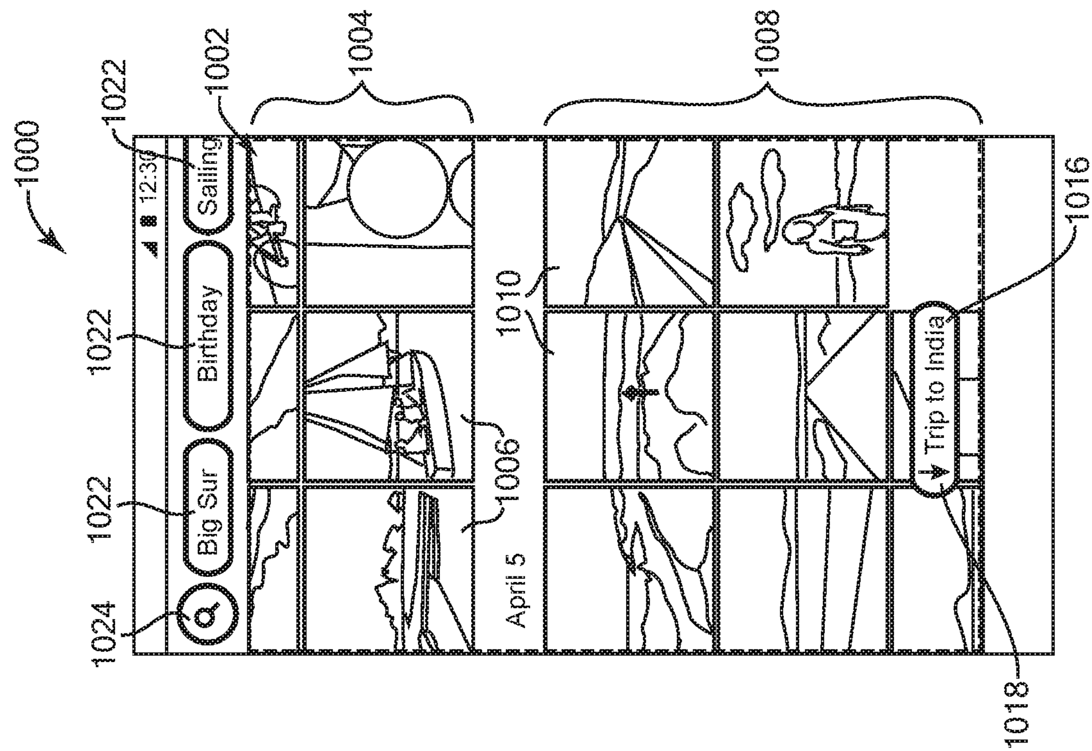
FIGS. 10-13 are graphic representations of example user interfaces that provide acceleration topics to enable accelerated display of content data items, according to some implementations.

FIG. 11 illustrates the graphical user interface 1000 of FIG. 10 displayed by a user device, where an acceleration topic element according to features described herein is displayed. The display view 1002 has changed such that the sections 1004 and 1008 have been scrolled upward in the display view 1002, e.g., the display view 1002 has been scrolled down with respect to the content elements, such that the view direction is forward in the sequence of content elements.

In this example, the scrolling has a scrolling rate that is above a particular threshold rate that is a trigger to display an acceleration topic element in the user interface 1000. In response to detecting the scrolling of the content elements being above the threshold scrolling rate, the device displays topic element 1016, which is an acceleration topic element. Topic element 1016 includes one or more text terms that are derived from one or more content data items corresponding to eligible content elements. Topic element 1016 can be selected to cause automatic input of the associated acceleration topic to the user interface 600. For example, user input can be provided to the user interface 1000 to select the topic element 1016. In some examples, the user can tap a touchscreen with a finger at a location of the display of the topic element to select the topic element, or provide other user input as described herein.

In some implementations, the acceleration topic in the topic element 1016 is determined based on one or more characteristics of eligible sections of content elements in the set of content elements, and/or based on one or more characteristics of eligible content data items. In this example, the eligible content data items are in the eligible sections. For example, the eligible section is the next section of content elements in the sequence of content elements that is not currently being displayed, e.g., at the time of the trigger to display the acceleration topic. For example, the eligible section can be the next section fully out of the display view and which would be the next section moved into the display view based on the scrolling. For example, the scrolling is in a forward direction in the sequence to display additional content elements positioned later in the sequence of content elements after the display view, so the acceleration topic can be based on the next section positioned in the sequence.

In some implementations, the eligible section is this next section that is fully out of the display view, e.g., has no content elements (or portions thereof) displayed in the display view at the time of the trigger to display the acceleration topic element. In some implementations, the eligible section has one or more content elements partially displayed in the display view at the time of the trigger to display the acceleration topic element.

In this example, a characteristic of the eligible section can be used as, or provide basis for, the acceleration topic in an acceleration topic element. For example, the section label of the eligible section (e.g., the next section) of content elements can be used as the text in the acceleration topic element 1016. In this example, the "Trip to India" acceleration topic text in acceleration topic element 1016 can be copied text from the heading of an eligible section of content elements.

In some cases or implementations, one or more characteristics of the eligible content data items can be used to determine the acceleration topic. The eligible content data items correspond to the eligible content elements in the eligible section. In some examples, the characteristic of the content data items in the eligible next section of content elements can be a most common content feature detected in the content data items of the next section, which is used to form the acceleration topic. In such an example, "Trip to India" in acceleration topic element 1016 can be based on location metadata of the content data items in the next section of content elements that indicate the content data items were created in the geographical location of India. Furthermore, a threshold percentage of the content data items in that section were captured at this location. For example, the term "India" can be determined from the location metadata based on map data showing labels of regions such as countries. In some implementations, the "Trip to" portion of the acceleration topic can be generated automatically based on other data, e.g., a history of content data items for the user and/or user data, if content from the user has been obtained. For example, a home and work locations of the user may be known based on movement of the user device (with user consent), and the India location of the content data items indicates a location away from the home and work locations, causing the method to add the term "Trip to" before the determined location.

In this example, the acceleration topic element 1016 is displayed near the bottom of the display view 1002. In examples using a mobile device, this location may be convenient for the user to select, e.g., with a thumb, and to repeatedly select if the user wishes to continue to the next displayed acceleration topic(s).

In this example, a direction indicator 1018 is also displayed in the display area of, or otherwise visually associated with, the acceleration topic element 1016. For example, the direction indicator 1018 indicates the scrolling direction (view direction) detected for the scrolling of the control elements (or other change in the display view). The direction indicator 1018 is displayed to indicate the direction in the sequence of content elements that would be provided to the display view if the acceleration topic element 1018 is selected by user input.

In some implementations, one or more other characteristics of the eligible content data items can be used to determine the acceleration topic, e.g., the acceleration topic can be based on these characteristics. For example, time of creation or descriptions of content features depicted in the content data items can be used, similarly as described above for the search topic elements of FIGS. 2-3 and 6-9.

In some implementations, the eligible section or content data items can be within a threshold distance of one or more content elements displayed in the display view 602, e.g., in a direction of the scrolling of (or other change in) the display view, similarly as described for the search topic elements of FIGS. 2-3 and 6-9.

In some implementations, the acceleration topic in the topic element 1016 is determined based on one or more other characteristics of content data items in the eligible sections and/or other content data items in the collection of content data items. The eligible content data items and content elements can be positioned in a direction of the sequence that is based on (e.g., corresponds to) the direction of change in the display view (e.g., scrolling direction), similarly as described above.

In some implementations, multiple acceleration topics can be determined and multiple acceleration topic elements can be displayed in user interface 1000. In some examples, the multiple acceleration topics can be displayed horizontally across the lower portion of the user interface 1000 or the display screen. The additional acceleration topics can display additional characteristics of content data items, e.g., in the view direction of scrolling (or other change in display view). In some examples, each additional acceleration topic can be based on a different section of content elements that next follows a previous section of content elements used to determine a different acceleration topic. In some implementations, one or more of the additional acceleration topics can be based on a previous section of content items that is in the opposite direction to the view direction (e.g., a back direction). In some implementations, a rank can be assigned to each acceleration topic similarly as described above for search topics, and a particular number of top-ranking acceleration topics can be displayed in acceleration topic elements in the user interface 1000.

In this example, the scrolling rate threshold is also used as a trigger to display search topic elements 1022 and a search interface element 1024, similarly as described above for FIGS. 6-9. In some examples, acceleration topic elements are displayed at the bottom of the screen of a mobile device, allowing access for the user's thumb, while search topics can be displayed at the top of the screen. Other configurations of topic elements can be displayed in other implementations.

In various implementations of search topic elements and/or acceleration topic elements, additional or fewer topic elements can be displayed in the user interface. For example, in some implementations, an expanding list of topic elements can be displayed, where, e.g., user input can command to display a larger menu of topic elements, scroll a list of topic elements, etc., where any of the displayed topic elements can be selected via additional user input. In some implementations, topic elements can be displayed in different locations with respect to the display view and/or the display screen, e.g., at the top (as shown), at the bottom, on the sides closed to the border of the display view or display area/screen, etc. In some implementations, displayed topic elements can be displayed for a limited amount of time, e.g., displayed on the side of the display view for a particular number of seconds.

Figure 12:
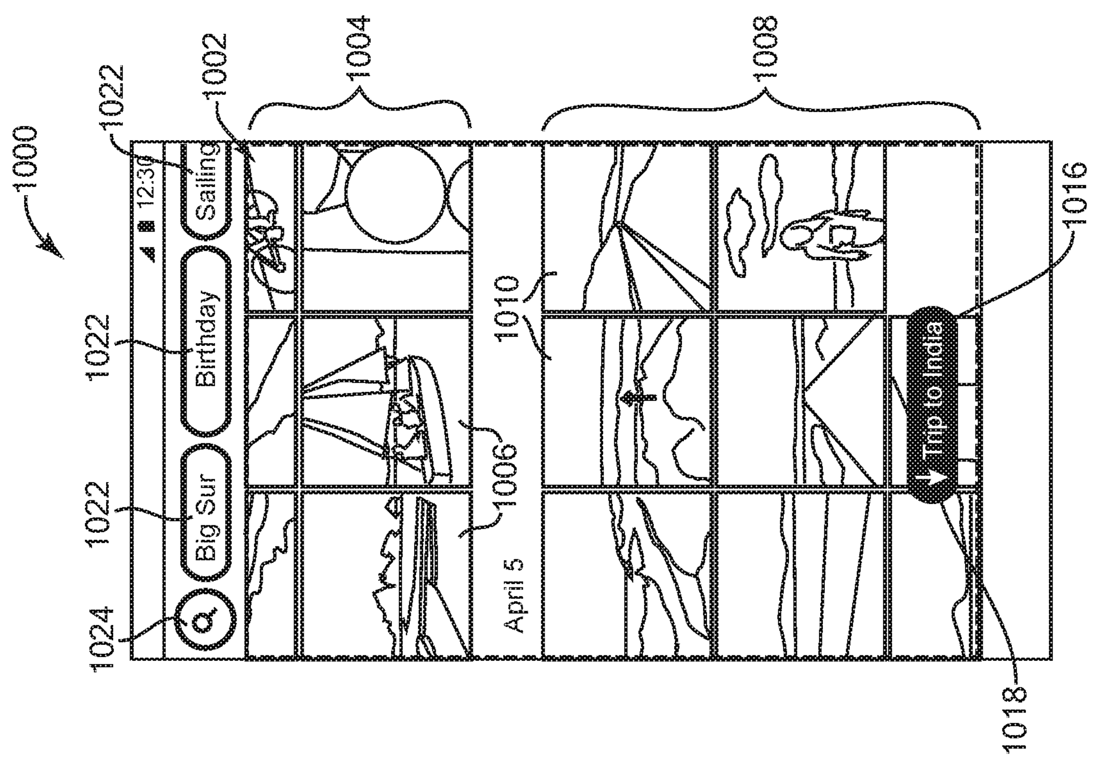

FIG. 12 illustrates the graphical user interface 1000 of FIG. 10 displayed by a user device, where the acceleration topic element 1016 has been selected by user input as indicated by the shown filled-in acceleration topic element 1016. For example, user input such as touch input on a touchscreen can select the topic element 1016, or other form of user input as described herein.

Figure 13:
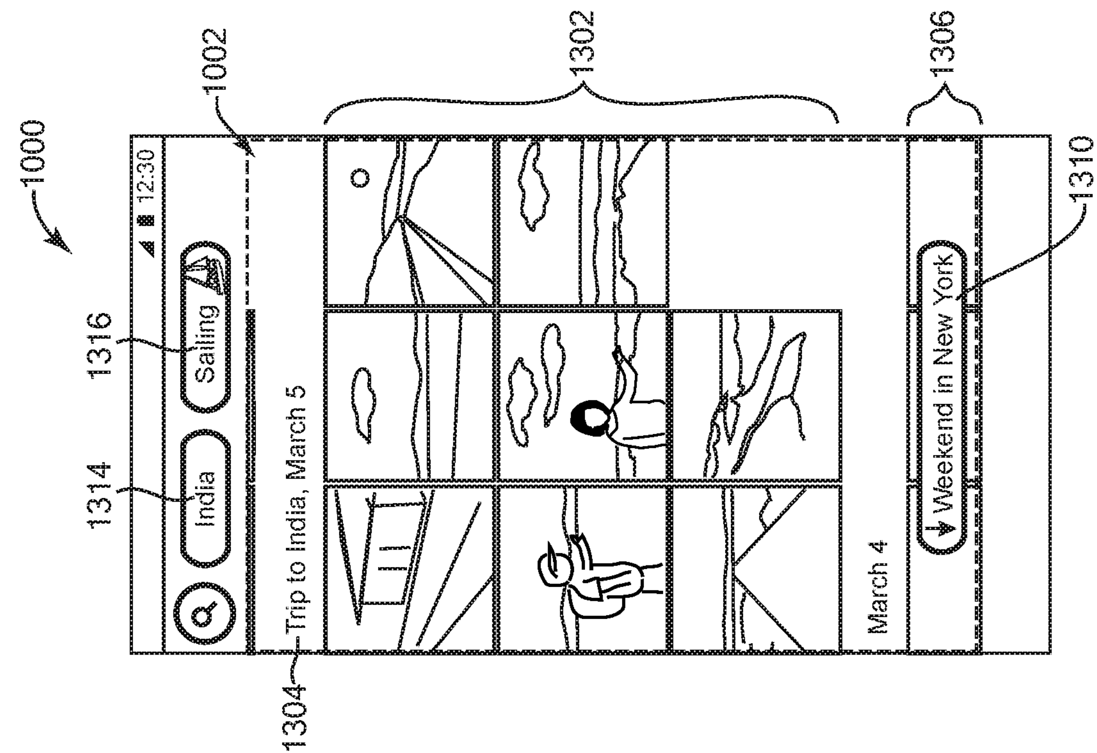

FIG. 13 illustrates the graphical user interface 1000 of FIG. 10 displayed by a user device, in response to acceleration topic element 1016 being selected by user input as indicated in FIG. 12.

Display view 1002 has been changed to display a different portion of the set of content elements in the display view that corresponds to the acceleration topic element 1016 selected as shown in FIG. 12. In this example, content elements are displayed that are in a section 1302 of content elements that have a section label 1304 that corresponds to the selected acceleration topic "Trip to India." In this example, the content elements in section 1302 were not displayed in the display view immediately prior to the selection of the acceleration topic element 1016 as shown in FIG. 13, e.g., section 1302 was fully out of the display view. The former content elements displayed in the display view 1002 (e.g., in FIGS. 11-12) have been removed and replaced by the results shown in FIG. 13. In this example, the content elements are displayed in the sequence of the set of content elements, which is based on time of creation of their corresponding content data items. The section 1306 of content elements following the section 1302 is the next section of the sequence of content data items.

In this example, a new acceleration topic element 1310 is displayed at the lower part of the display view 1002 in place of the acceleration topic element 1016 shown in FIGS. 12-13. Acceleration topic element 1310 is determined based on the new position of the display view similarly as the topic element 1016 was determined as described for FIG. 12, e.g., based on a scrolling of content elements in the display view 1002 and eligible section(s) and/or content data items.

In this example, two new search topic elements 1314 and 1316 are displayed at the top part of the display view 1002, in place of the former search topics shown in FIG. 12. For example, the search topic elements 1314 and 1316 can be determined based on the new position of the display view in the set of content elements, such that the search topics are determined based on content data items within a threshold distance of this new position of the display view.

Figure 14:
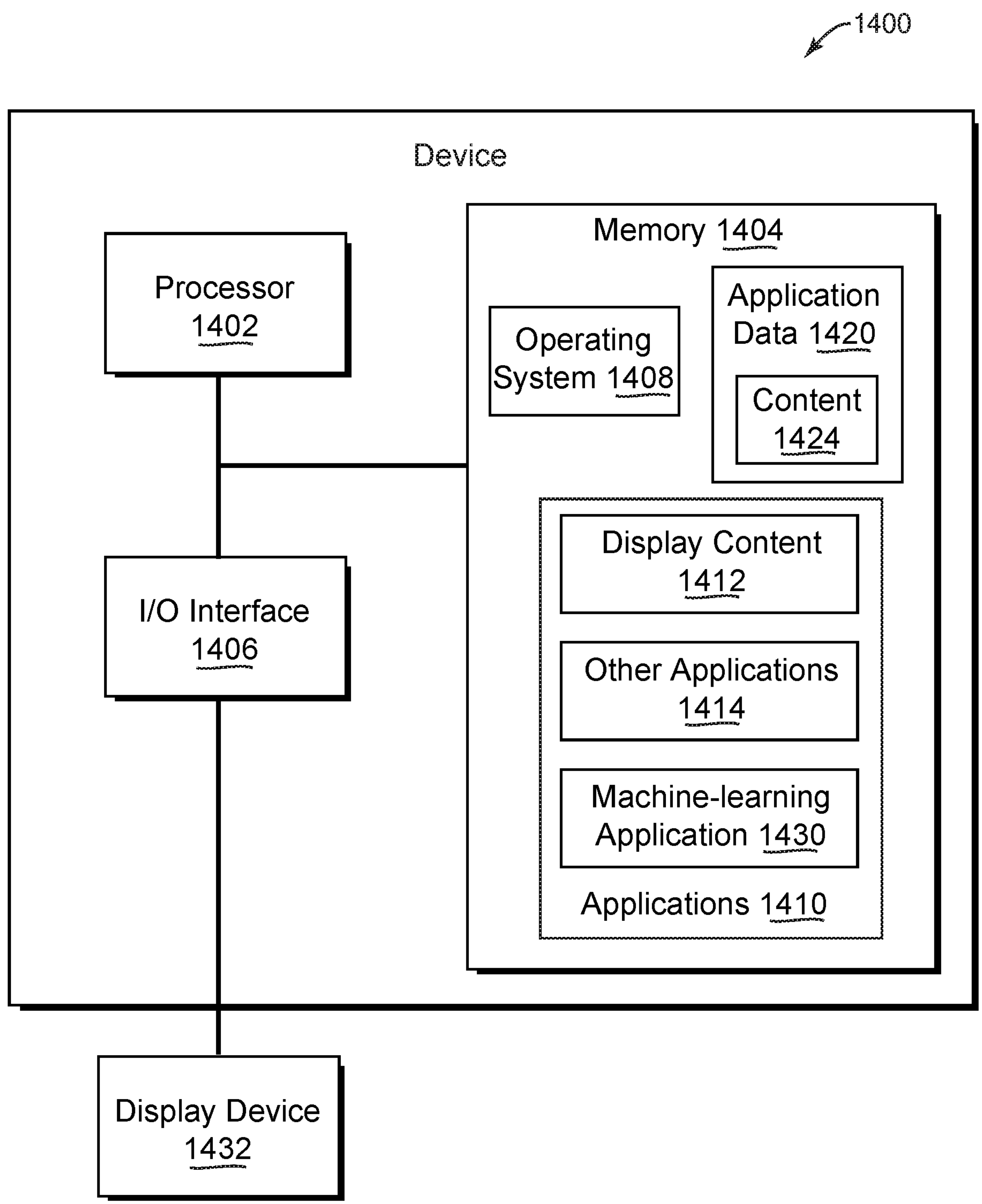
FIG. 14 is a block diagram of an example device which may be used for one or more implementations described herein.

FIG. 14 is a block diagram of an example device 1400 which may be used to implement one or more features described herein. In one example, device 1400 may be used to implement a computer device, e.g., a server device (e.g., server device 104 of FIG. 1), and perform appropriate method implementations described herein. In some implementations, device 1400 can be a client device to implement and/or be used with features described herein, e.g., client devices 120-126 shown in FIG. 1. Device 1400 can be any suitable computer system, server, or other electronic or hardware device. For example, the device 1400 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.).

In some implementations, device 1400 includes a processor 1402, a memory 1404, and input/output (I/O) interface 1406.

Processor 1402 can be one or more processors and/or processing circuits to execute program code and control basic operations of the device 1400. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1404 is typically provided in device 1400 for access by the processor 1402, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1402 and/or integrated therewith. Memory 1404 can store software operating on the server device 1400 by the processor 1402, including an operating system 1408, one or more applications 1410, and application data 1420. In some implementations, applications 1410 can include instructions that enable processor 1402 to perform the functions described herein, e.g., some or all of the methods of FIGS. 2-5. Memory 1404 and any other type of storage (magnetic disk, optical disk, magnetic tape, or other tangible media) can be considered "storage" or "storage devices."

For example, applications 1410 can include a display content application 1412, which as described herein can provide content viewing functions, e.g., displaying content elements in a display view of a graphical user interface that correspond to content data items, where the user interface is receptive to user input to scroll or otherwise change the displayed content elements. Other applications or engines 1414 can also be included in applications 1410, e.g., communication applications, web browser applications, media display applications, web hosting engine or application, social networking engine or application, etc. In some implementations, a user interaction module and/or one or more of the other applications 1410 can, for example, provide a displayed user interface responsive to user input to display selectable options or controls, and data based on selected options. Any of software in memory 1404 can alternatively be stored on any other suitable storage location or computer-readable medium. In addition, memory 1404 (and/or other connected storage device(s)) can store content elements, content data items and metadata, section labels, user data and preferences, and other instructions and data used in the features described herein.

For example, application data 1420 can include one or more content data items 1424 and corresponding content elements 1426. Content data 1424 can include content data items such as images, videos, and other types of content as described herein, and associated metadata. In some examples, device 1400 can be a client device, and content data 1424 can include images and/or videos captured by a camera of the client device (not shown). In another example, device 1400 is a server device, and content data 1424 can be stored at the server (e.g., uploaded to the server from client devices). In some implementations, metadata may be stored along with, or separately from content data 1424.

In various implementations, the other applications 1414 can include a machine-learning application 1430 which can be used in various implementations described herein. For example, machine-learning application 1430 may utilize Bayesian classifiers, support vector machines, neural networks, or other learning techniques. In some implementations, machine-learning application 1430 may include a trained model, an inference engine, and data. In some implementations, the data may include training data, e.g., data used to generate the trained model. For example, the training data may include any type of data such as text, images, audio, video, etc. Training data may be obtained from any source, e.g., a data repository specifically marked for training, data for which permission is provided for use as training data for machine-learning, etc. In implementations where one or more users permit use of their respective user data to train the trained model, training data may include such user data. In implementations where users permit use of their respective user data, the data may include permitted data such as content data items (images, videos, audio segments, etc.), communications (e.g., e-mail; chat data such as text messages, voice, video, etc.), documents (e.g., spreadsheets, text documents, presentations, etc.)

In some implementations, the data may include collected data such as map data, image data (e.g., satellite imagery, overhead imagery, etc.), game data, etc. In some implementations, training data may include synthetic data generated for the purpose of training, such as data that is not based on user input or activity in the context that is being trained, e.g., data generated from simulated conversations, computer-generated images, etc. In some implementations, machine-learning application 1430 excludes the data. For example, in these implementations, the trained model may be generated, e.g., on a different device, and be provided as part of machine-learning application 1430. In various implementations, the trained model may be provided as a data file that includes a model structure or form, and associated weights. The inference engine may read the data file for the trained model and implement a neural network with node connectivity, layers, and weights based on the model structure or form specified in the trained model.

The machine-learning application also includes a trained model. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence (e.g., in a chat message), frames in a video, etc. and produces as output a result sequence), etc. The model form or structure may specify connectivity between various nodes and organization of nodes into layers. For example, nodes of a first layer (e.g., input layer) may receive data as input data or application data. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of machine-learning application 1430. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In different implementations, the trained model can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using the data described above, to produce a result.

For example, training may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input. In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to differentiate images such that the model distinguishes abstract images (e.g., synthetic images, human-drawn images, etc.) from natural images (e.g., photos).

In another example, a model trained using unsupervised learning may cluster words based on the use of the words in input sentences. In some implementations, unsupervised learning may be used to produce knowledge representations, e.g., that may be used by machine-learning application 1430. In various implementations, a trained model includes a set of weights, or embeddings, corresponding to the model structure. In implementations where the data is omitted, machine-learning application 1430 may include the trained model that is based on prior training, e.g., by a developer of machine-learning application 1430, by a third-party, etc. In some implementations, the trained model may include a set of weights that are fixed, e.g., downloaded from a server that provides the weights.

Machine-learning application 1430 also may include an inference engine. The inference engine is configured to apply the trained model to data, such as application data, to provide an inference. In some implementations, inference engine may include software code to be executed by processor 1402. In some implementations, the inference engine may specify circuit configuration (e.g., for a programmable processor, for a field programmable gate array (FPGA), etc.) enabling processor 1402 to apply the trained model. In some implementations, the inference engine may include software instructions, hardware instructions, or a combination. In some implementations, the inference engine may offer an application programming interface (API) that can be used by operating system 1408 and/or applications 1412 and 1414 to invoke the inference engine, e.g., to apply the trained model to application data to generate an inference.

Machine-learning application 1430 may provide several technical advantages. For example, when the trained model is generated based on unsupervised learning, the trained model can be applied by inference engine to produce knowledge representations (e.g., numeric representations) from input data, e.g., application data. For example, a model trained for image analysis may produce representations of images that have a smaller data size (e.g., 1 KB) than input images (e.g., 10 MB). In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of the inference engine. In some implementations, knowledge representations generated by machine-learning application 1430 may be provided to a different device that conducts further processing, e.g., over a network. In such implementations, providing the knowledge representations rather than the images may provide a technical benefit, e.g., enable faster data transmission with reduced cost. In another example, a model trained for clustering documents may produce document clusters from input documents. The document clusters may be suitable for further processing (e.g., determining whether a document is related to a topic, determining a classification category for the document, etc.) without the need to access the original document, and therefore, save computational cost.

In some implementations, machine-learning application 1430 may be implemented in an offline manner. In these implementations, the trained model may be generated in a first stage, and provided as part of machine-learning application 1430. In some implementations, machine-learning application 1430 may be implemented in an online manner. For example, in such implementations, an application that invokes machine-learning application 1430 (e.g., operating system 1408, one or more of other applications 1414) may utilize an inference produced by machine-learning application 1430, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update the trained model, e.g., to update embeddings for the trained model.

In some implementations, machine-learning application 1430 may be implemented in a manner that can adapt to particular configuration of device 1400 on which machine-learning application 1430 is executed. For example, machine-learning application 1430 may determine a computational graph that utilizes available computational resources, e.g., processor 1402. For example, if machine-learning application 1430 is implemented as a distributed application on multiple devices, machine-learning application 1430 may determine computations to be carried out on individual devices in a manner that optimizes computation. In another example, machine-learning application 1430 may determine that processor 1402 includes a GPU with a particular number of GPU cores (e.g., 1,000) and implement the inference engine accordingly (e.g., as 1,000 individual processes or threads).

In some implementations, machine-learning application 1430 may implement an ensemble of trained models. For example, the trained model may include a plurality of trained models that are each applicable to same input data. In these implementations, machine-learning application 1430 may choose a particular trained model, e.g., based on available computational resources, success rate with prior inferences, etc. In some implementations, machine-learning application 1430 may execute the inference engine such that a plurality of trained models is applied. In these implementations, machine-learning application 1430 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking machine-learning application 1430, e.g., by operating system 1408 or one or more applications 1412 or 1414.

In different implementations, machine-learning application 1430 can produce different types of outputs. For example, machine-learning application 1430 can provide representations or clusters (e.g., numeric representations of input data), labels (e.g., for input data that includes images, documents, etc.), phrases or sentences (e.g., descriptive of an image or video, suitable for use as a response to an input sentence, etc.), images (e.g., generated by machine-learning application 1430 in response to input), audio or video (e.g., in response an input video, machine-learning application 1430 may produce an output video with a particular effect applied, e.g., rendered in a comic-book or particular artist's style, when the trained model is trained using training data from the comic book or particular artist, etc. In some implementations, machine-learning application 1430 may produce an output based on a format specified by an invoking application, e.g. operating system 1408 or one or more applications 1412 or 1414. In some implementations, an invoking application may be another machine-learning application. For example, such configurations may be used in generative adversarial networks, where an invoking machine-learning application is trained using output from machine-learning application 1430 and vice-versa.

Any of software in memory 1404 can alternatively be stored on any other suitable storage location or computer-readable medium. In addition, memory 1404 (and/or other connected storage device(s)) can store one or more messages, one or more taxonomies, electronic encyclopedia, dictionaries, thesauruses, message data, grammars, user preferences, and/or other instructions and data used in the features described herein. Memory 1404 and any other type of storage (magnetic disk, optical disk, magnetic tape, or other tangible media) can be considered "storage" or "storage devices."

I/O interface 1406 can provide functions to enable interfacing the server device 1400 with other systems and devices. Interfaced devices can be included as part of the device 1400 or can be separate and communicate with the device 1400. For example, network communication devices, storage devices (e.g., memory and/or database 106), and input/output devices can communicate via I/O interface 1406. In some implementations, the I/O interface can connect to interface devices such as input devices (keyboard, pointing device, touchscreen, microphone, camera, scanner, sensors, etc.) and/or output devices (display device, speaker devices, printer, motor, etc.). Some examples of interface devices include one or more cameras which can capture images. Some implementations can provide a microphone for capturing sound (e.g., as a part of captured images, voice commands, etc.), audio speaker devices for outputting sound, or other input and output devices.

Additional examples of interfaced devices that can connect to I/O interface 1406 can include one or more display devices 1432 that can be used to display content, e.g., images, video, and/or a user interface of an output application as described herein. Display device 1432 can be connected to device 1400 via local connections (e.g., display bus) and/or via networked connections and can be any suitable display device. Display device 1432 can include any suitable display device such as an LCD, LED, or plasma display screen, CRT, television, monitor, touchscreen, 3-D display screen, or other visual display device. For example, display device 1432 can be a flat display screen provided on a mobile device, multiple display screens provided in a goggles device, or a monitor screen for a computer device.

For ease of illustration, FIG. 14 shows one block for each of processor 1402, memory 1404, I/O interface 1406, and software blocks 1408, 1410, 1412, 1414, and 1430. These blocks may represent one or more processors or processing circuitries, operating systems, memories, I/O interfaces, applications, and/or software modules. In other implementations, device 1400 may not have all of the components shown and/or may have other elements including other types of elements instead of, or in addition to, those shown herein. While some components are described as performing blocks and operations as described in some implementations herein, any suitable component or combination of components of network environment 100, device 1400, similar systems, or any suitable processor or processors associated with such a system, may perform the blocks and operations described.

One or more methods disclosed herein can operate in several environments and platforms, e.g., as a stand-alone computer program that can run on any type of computing device, as a web application having web pages, as a mobile application ("app") run on a mobile computing device, etc.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to provide user-selectable interface elements in a displayed graphical user interface, the method comprising:
   - causing a first subset of content elements of a set of content elements to be presented in a display view of the graphical user interface, wherein the content elements in the set of content elements are in a sequence and wherein the set of content elements corresponds to a collection of content data items;
   - detecting first user input, wherein the first user input includes one or more commands to cause scrolling or page flipping of a plurality of content elements in the display view, wherein the first user input instructs display of at least one content element next or previous in the sequence of the set of content elements;
   - in response to the first user input:
     - causing a change of the display view based on the first user input, wherein causing the change of the display view includes the scrolling or the page flipping of the plurality of content elements in the display view, wherein the change of the display view includes a second subset of the set of content elements being presented in the display view;
     - identifying one or more search topics based on one or more content characteristics associated with one or more content elements that are in a third subset of the set of content elements, wherein the third subset is smaller than the set of content elements; and
     - causing one or more topic elements to be displayed in the graphical user interface, wherein each topic element of the one or more topic elements corresponds to a respective search topic of the one or more search topics;

receiving second user input indicative of selection of a particular topic element of the one or more topic elements; and in response to the second user input, searching the collection of content data items to identify one or more resulting content data items that have at least one content characteristic corresponding to a search topic that corresponds to the particular topic element; and updating the display view to present at least one resulting content element that corresponds to at least one resulting content data item of the one or more resulting content data items.

2. The computer-implemented method of claim 1, wherein causing the change of the display view includes the scrolling of the plurality of content elements in the display view.

3. The computer-implemented method of claim 2, wherein identifying the one or more search topics is in response to a rate of the scrolling meeting a threshold scrolling rate, wherein the rate of the scrolling is based at least in part on the first user input.

4. The computer-implemented method of claim 2, wherein identifying the one or more search topics is additionally based on the one or more content elements being within a threshold distance of the first subset of content elements in the display view, wherein the threshold distance is based on a rate of the scrolling.

5. The computer-implemented method of claim 4, wherein the threshold distance includes at least one of:

a threshold number of content elements from the display view in a direction of the sequence of the set of content elements based on the first user input.

6. The computer-implemented method of claim 1, wherein the one or more search topics are in a subset of a plurality of search topics identified based on the one or more content characteristics associated with the one or more content elements, wherein the one or more search topics are identified based on ranks of the one or more search topics, wherein the ranks are based on types of content features associated with the search topics, wherein the types of content features include faces and landscape features.

7. The computer-implemented method of claim 1, wherein the one or more search topics are in a subset of a plurality of search topics, wherein the one or more search topics are identified based on an association with at least one content element that is positioned in a view direction in the sequence, the view direction based on the first user input.

8. The computer-implemented method of claim 1, wherein the collection of content data items is a collection of images, and wherein the one or more topic elements include representative images of content features that are included in one or more images associated with the one or more content elements.

9. The computer-implemented method of claim 1, wherein the collection of content data items is a collection of images, wherein the one or more content characteristics include at least one of: one or more image content features depicted in one or more content data items associated with the one or more content elements, one or more times of creation of the one or more content data items associated with the one or more content elements, or one or more locations of capture of the one or more content data items associated with the one or more content elements.

10. The computer-implemented method of claim 1, wherein identifying the one or more search topics is additionally based on a previous user selection of one or more selected content elements of the set of content elements.

11. A computer-implemented method comprising:

causing a first subset of content elements of a set of content elements to be displayed in a display view of a graphical user interface, wherein the content elements in the set of content elements are in a sequence;

detecting first user input, wherein the first user input includes one or more commands to cause scrolling or page flipping of a plurality of content elements in the display view, wherein the first user input instructs display of at least one content element next or previous in the sequence of the set of content elements;

in response to the first user input:

causing a change of the display view based on the first user input, wherein causing the change of the display view includes the scrolling or the page flipping of the plurality of content elements in the display view, wherein the change of the display view includes a second subset of content elements of the set of content elements being displayed in the display view;

determining one or more acceleration topics that are associated with one or more sections of content elements in the set of content elements, wherein the one or more acceleration topics are based on one or more characteristics of one or more content elements in the one or more sections of content elements, and wherein the one or more sections of content elements are in a third subset of the set of content elements, the third subset being smaller than the set of content elements; and causing one or more topic elements to be displayed in the graphical user interface, wherein each topic element corresponds to a respective acceleration topic of the one or more acceleration topics;

receiving second user input indicative of a selection of a particular topic element of the one or more topic elements; and in response to the second user input, causing the display view to be updated to include at least a portion of a section of content elements that corresponds to the particular topic element.

12. The computer-implemented method of claim 11, wherein the one or more acceleration topics include a particular acceleration topic that corresponds to a next or previous section of content elements in the sequence with respect to the display view, wherein the next or previous section of content elements is based on the first user input and is not displayed in the display view at a time of receiving the first user input.

13. The computer-implemented method of claim 11, wherein the one or more acceleration topics correspond to respective sections of the one or more sections of content elements, the respective sections located in a sequence in a direction of the change of the display view.

14. The computer-implemented method of claim 13, wherein the respective sections each include a respective section label, wherein the one or more topic elements are one or more section labels of the respective section labels.

15. The computer-implemented method of claim 11, wherein the one or more characteristics of the one or more content elements in the one or more sections include at least one of:

a date associated with the one or more content elements in a particular section of the one or more sections, wherein at least one acceleration topic of the one or more acceleration topics includes a first label determined based on the date;

a location associated with the one or more content elements in the particular section of the one or more sections, wherein the at least one acceleration topic of the one or more acceleration topics includes a second label determined based on the location, wherein the location associated with the one or more content elements in the particular section is a location at which the one or more content elements in the particular section were captured; or one or more content features depicted in the one or more content elements in the particular section.

16. The computer-implemented method of claim 11, further comprising:

determining whether the change of the display view includes a scrolling of a plurality of content elements in the display view at a rate that meets a threshold rate, wherein the rate is based on the first user input, and wherein causing the one or more topic elements to be displayed is performed in response to determining that the scrolling of the plurality of content elements meets the threshold rate.

17. The computer-implemented method of claim 11, wherein wherein a first acceleration topic of the one or more acceleration topics is associated with a first section of content elements located in a first direction of the sequence of the set of content elements in accordance with the change of the display view, and wherein a second acceleration topic of the one or more acceleration topics is associated with a second section of content elements located in a second direction of the sequence of the set of content elements, the second direction opposite to the first direction.

18. A system comprising:

a memory with instructions stored thereon; and at least one processor in communication with the memory and configured to execute the instructions, the instructions causing the processor to perform operations comprising:

causing a first subset of content elements of a set of content elements to be presented in a display view of a graphical user interface, wherein content elements in the set of content elements are in a sequence, and wherein the set of content elements corresponds to a collection of content data items;

detecting first user input, wherein the first user input includes one or more commands to cause scrolling or page flipping of a plurality of content elements in the display view, wherein the first user input instructs display of at least one content element next or previous in the sequence of the set of content elements;

in response to the first user input, causing a change of the display view based on the first user input, wherein causing the change of the display view includes the scrolling or the page flipping of the plurality of content elements in the display view, wherein the change of the display view includes a second subset of the set of content elements being presented in the display view;

identifying one or more search topics based on one or more content characteristics associated with one or more content elements that are in a third subset of the set of content elements, wherein the third subset is smaller than the set of content elements; and causing one or more topic elements to be displayed in the graphical user interface, wherein each topic element corresponds to a respective search topic of the one or more search topics;

receiving second user input indicative of selection of a particular topic element of the one or more topic elements; and in response to the second user input, searching the collection of content data items to identify one or more resulting content data items that have at least one content characteristic corresponding to a search topic that corresponds to the particular topic element; and updating the display view to present at least one resulting content element that corresponds to at least one resulting content data item of the one or more resulting content data items.

19. The system of claim 18, wherein the operation of causing a change of the display view includes the scrolling of the plurality of content elements in the display view, wherein the operation of identifying the one or more search topics is in response to a rate of the scrolling meeting a threshold scrolling rate, wherein the rate of the scrolling is based at least in part on the first user input.

* * * * *